United States Patent
You et al.

(10) Patent No.: US 12,501,442 B2
(45) Date of Patent: Dec. 16, 2025

(54) METHOD FOR CONFIGURING TRANSMISSION OR RECEPTION TIMING OF WIRELESS DEVICE, AND DEVICE USING SAME METHOD

(71) Applicant: LG ELECTRONICS INC., Seoul (KR)

(72) Inventors: Hyangsun You, Seoul (KR); Hyunsoo Ko, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 381 days.

(21) Appl. No.: 18/020,060

(22) PCT Filed: Aug. 5, 2021

(86) PCT No.: PCT/KR2021/010346
§ 371 (c)(1),
(2) Date: Feb. 6, 2023

(87) PCT Pub. No.: WO2022/031080
PCT Pub. Date: Feb. 10, 2022

(65) Prior Publication Data
US 2023/0328745 A1    Oct. 12, 2023

(30) Foreign Application Priority Data
Aug. 5, 2020   (KR) .......................... 10-2020-0097895

(51) Int. Cl.
*H04W 72/23*        (2023.01)
(52) U.S. Cl.
CPC .................................. *H04W 72/23* (2023.01)

(58) Field of Classification Search
CPC .................................................. H04W 72/23
See application file for complete search history.

(56) References Cited

U.S. PATENT DOCUMENTS

2014/0126460 A1* 5/2014 Bienas ................ H04W 74/002
2015/0271841 A1* 9/2015 Yamada ................ H04W 72/02
(Continued)

FOREIGN PATENT DOCUMENTS

KR     20170025667    3/2017
KR     102014794      10/2019

OTHER PUBLICATIONS

Zte, "Pathloss and DL timing reference for MTA," 3GPP TSG-RAN WG2 Meeting #75, R2-114773, Aug. 2011, 6 pages.
(Continued)

*Primary Examiner* — Ronald B Abelson
(74) *Attorney, Agent, or Firm* — LEE, HONG, DEGERMAN, KANG & WAIMEY

(57) ABSTRACT

The present specification provides a method for configuring transmission or reception timing of a wireless device, and a device using the same method. A method for performing uplink transmission by a wireless device in a wireless communication system may comprise a method in which, on the basis that a first serving cell and a second serving cell are included in a particular timing advance group (TAG), and first uplink transmission timing and second uplink transmission timing are different from each other, the uplink transmission is performed on the basis of uplink transmission timing coinciding with reference uplink transmission timing applied to a downlink timing reference cell among the first uplink transmission timing and the second uplink transmission timing.

7 Claims, 27 Drawing Sheets

(56) References Cited

U.S. PATENT DOCUMENTS

2018/0213512 A1    7/2018  Ryu et al.
2019/0394738 A1*  12/2019  Abedini ............ H04W 56/0015

OTHER PUBLICATIONS

Huawei et al., "Discussion on Guard Symbols in IAB," 3GPP TSG-RAN WG1 Meeting #101-e, e-Meeting, R1-2004619, May 2020, 4 pages.
PCT International Application No. PCT/KR2021/010346, International Search Report dated Nov. 24, 2021, 4 pages.

* cited by examiner

METHOD FOR CONFIGURING TRANSMISSION OR RECEPTION TIMING OF WIRELESS DEVICE, AND DEVICE USING SAME METHOD

CROSS-REFERENCE TO RELATED APPLICATION(S)

This application is the National Stage filing under 35 U.S.C. 371 of International Application No. PCT/KR2021/010346, filed on Aug. 5, 2021, which claims the benefit of earlier filing date and right of priority to Korean Application No. 10-2020-0097895, filed on Aug. 5, 2020, the contents of which are all incorporated by reference herein in their entirety.

TECHNICAL FIELD

The present disclosure relates to wireless communication.

BACKGROUND

One potential technology aimed at enabling future cellular network deployment scenarios and applications is support for wireless backhaul and relay links. This enables flexible and highly dense deployment of NR cells without the need to proportionally densify the transport network.

It is expected that greater bandwidth in NR compared to LTE with the native deployment of massive MIMO or multi-beam systems will be available. Thus (e.g., mmWave spectrum) creates opportunities for the development and deployment of integrated access and backhaul links. This makes it easier for a deployment of a dense network of self-backhauled NR cells in a more integrated manner by establishing multiple control and data channels/procedures defined to provide access or access to the terminals. Such systems are referred to as integrated access and backhaul links (IAB).

SUMMARY

According to the present specification, a method for configuring transmission/reception timing of a wireless device and a device using the same are proposed.

More efficient communication is possible by proposing an uplink transmission method of an IAB node MT or a user equipment (UE) when different uplink transmission timings are configured for serving cells in the same TAG.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

The following drawings were created to explain a specific example of the present specification. Since the names of specific devices described in the drawings or the names of specific signals/messages/fields are presented by way of example, the technical features of the present specification are not limited to the specific names used in the following drawings.

DETAILED DESCRIPTION

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features individually described within a drawing in the present disclosure may be implemented individually or may be implemented simultaneously.

Figure 1:
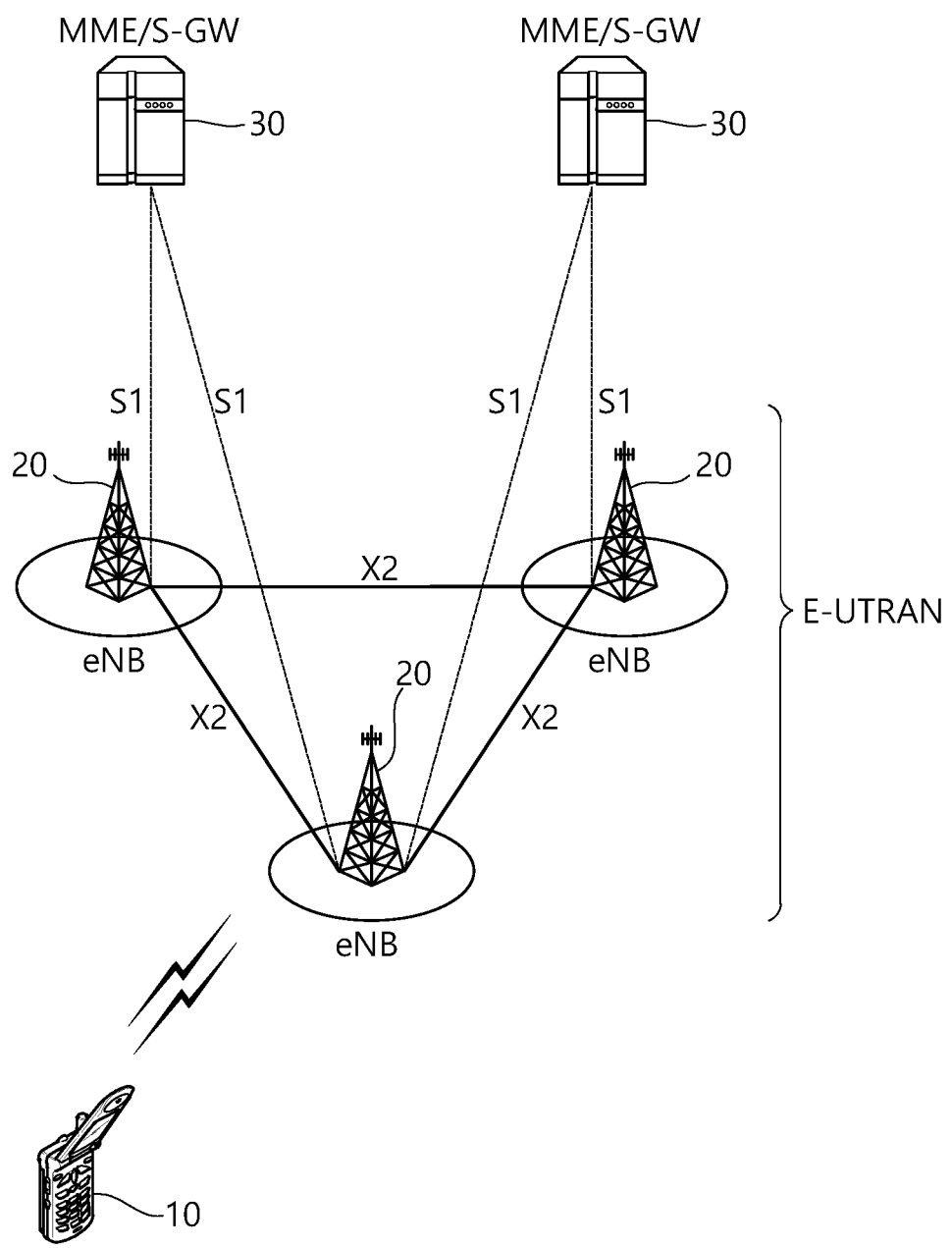
FIG. 1 shows a wireless communication system to which the present disclosure can be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
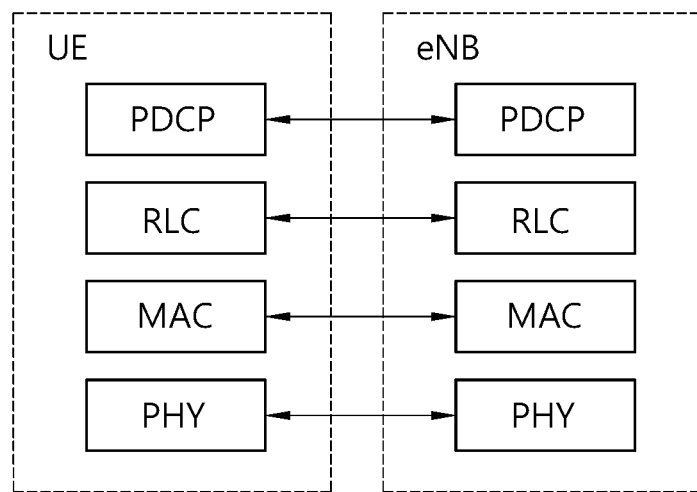
FIG. 2 is a diagram showing a wireless protocol architecture for a user plane.
Figure 3:
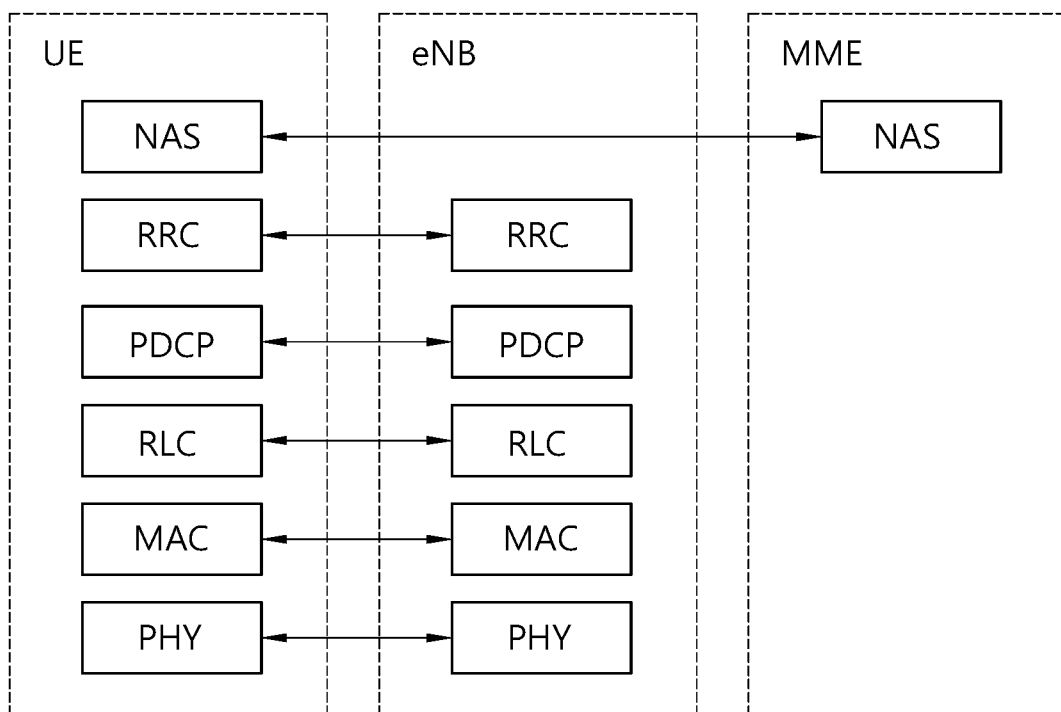
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QOS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission, e.g., a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
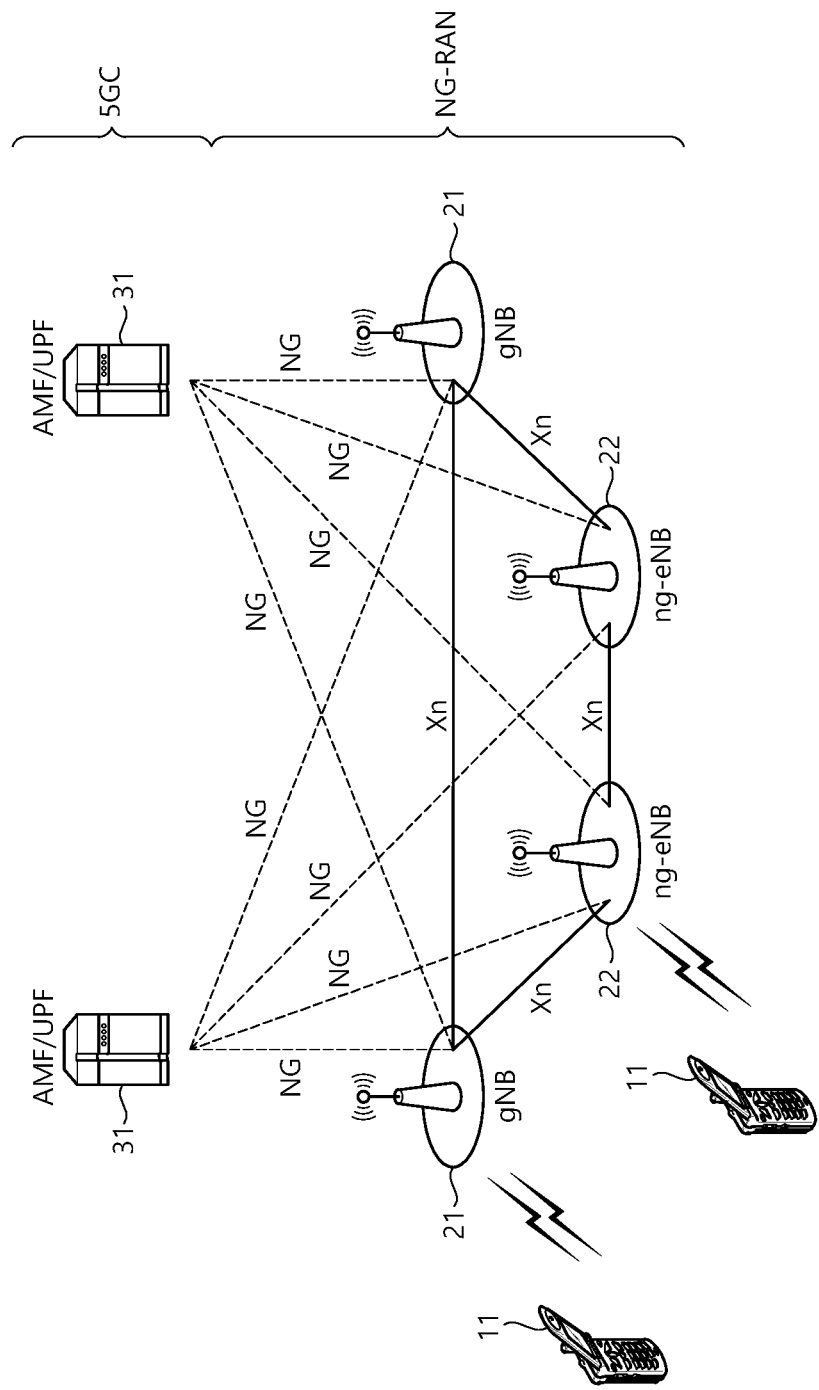
FIG. 4 shows another example of a wireless communication system to which the technical features of the present disclosure can be applied.

FIG. 4 shows another wireless communication system to which the present disclosure may be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a 5th generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and a control plane protocol termination towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
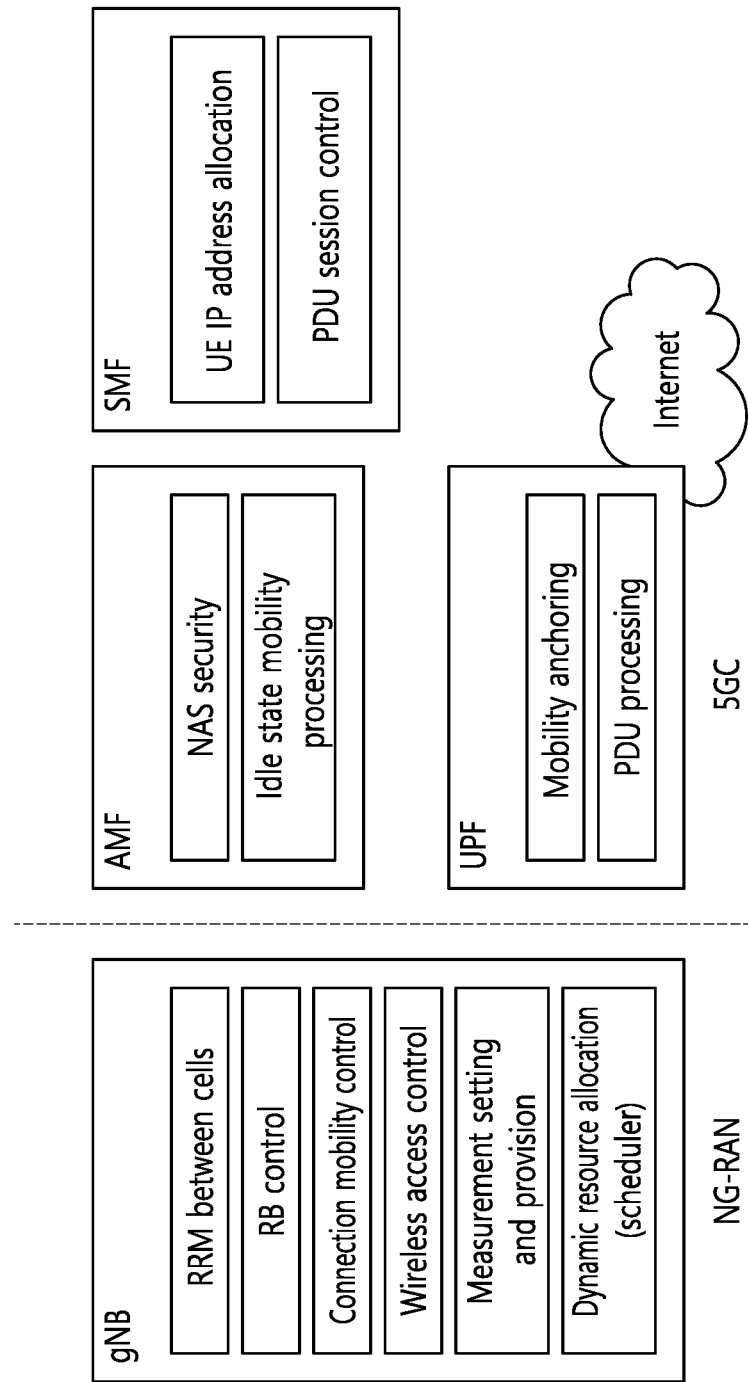
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
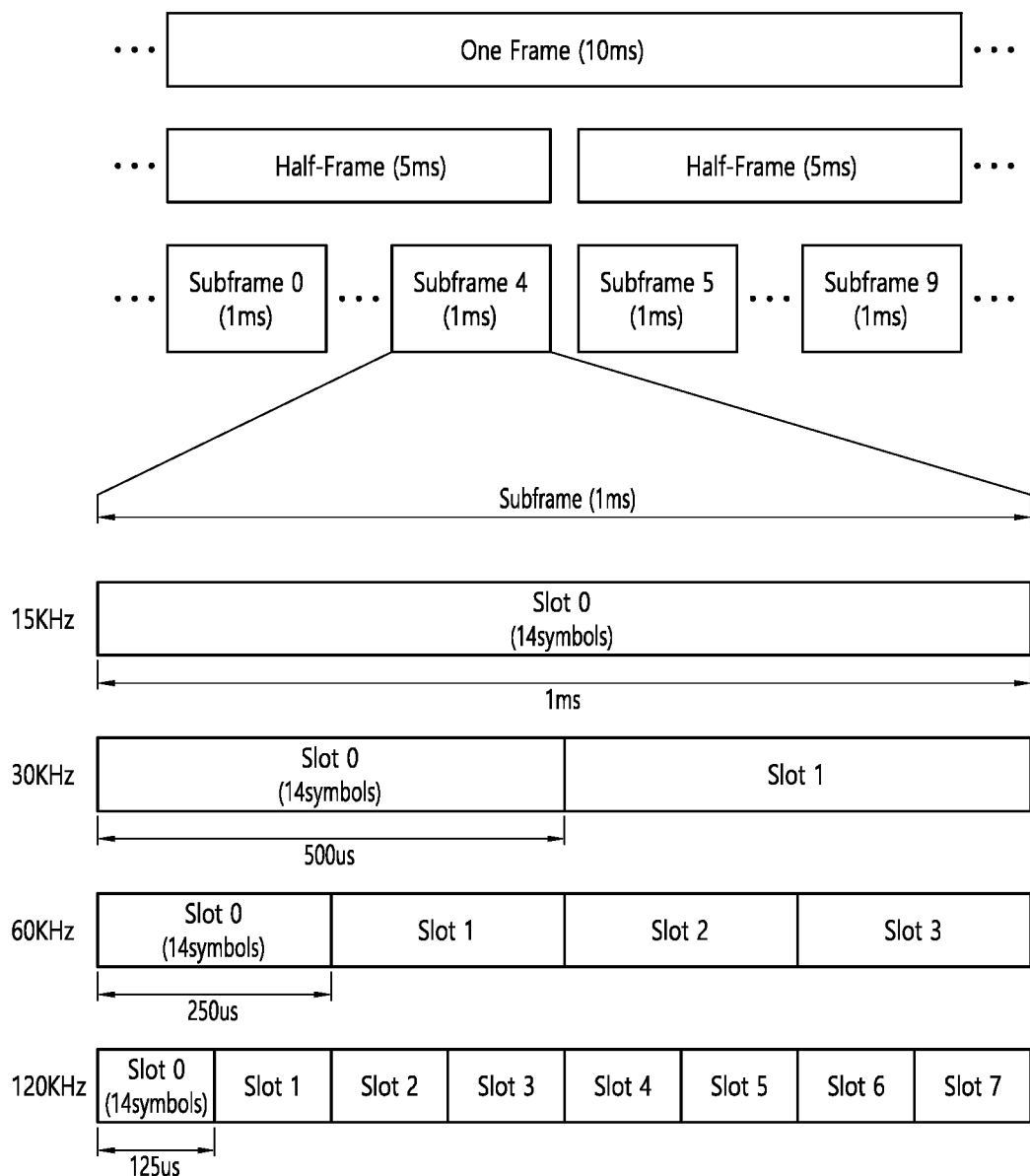
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM (A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in a subframe according to subcarrier spacings.

The following table 1 illustrates a subcarrier spacing configuration u.

TABLE 1

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal |
|   |   | Extended |
| 3 | 120 | Normal |
| 4 | 240 | Normal |

The following table 2 illustrates the number of slots in a frame ($N^{frame,u}_{slot}$), the number of slots in a subframe ($N^{subframe,u}_{slot}$), the number of symbols in a slot ($N^{slot}_{symb}$), and the like, according to subcarrier spacing configurations u.

TABLE 2

| μ | $N^{slot}_{symb}$ | $N^{frame, \mu}_{slot}$ | $N^{subframe, \mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 2-continued

| μ | $N_{symb}^{slot}$ | $N_{slot}^{frame, \mu}$ | $N_{slot}^{subframe, \mu}$ |
| --- | --- | --- | --- |

Table 3 below illustrates that the number of symbols per slot, the number of slots per frame, and the number of slots per subframe vary depending on the SCS, in case of using an extended CP.

TABLE 3

| SCS($15*2^\mu$) | $N_{symb}^{slot}$ | $N_{slot}^{frame, \mu}$ | $N_{slot}^{subframe, \mu}$ |
| --- | --- | --- | --- |
| 60 KHz (μ = 2) | 12 | 40 | 4 |

NR supports multiple numbers (or subcarrier spacing (SCS)) to support various 5G services. For example, when the SCS is 15 kHz, a wide region in the legacy cellular band is supported; and when the SCS is 30 kHz/60 kHz, dense urban areas, low time delay and wide carrier bandwidth are supported; and when the SCS is 60 kHz or more, a bandwidth of more than 24.25 GHz is supported in order to overcome phase noise.

The NR frequency band may be defined as two types of frequency ranges (FR1 and FR2). A numerical value of the frequency range may be changed and, for example, the two types of frequency ranges (FR1 and FR2) may be as shown in Table 4 below. For convenience of explanation, among the frequency ranges used in the NR system, FR1 may refer to "sub 6 GHz range" and FR2 may refer to "above 6 GHz range" and may be called millimeter wave (mmW).

TABLE 4

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHZ | 60, 120, 240 kHz |

As described above, the numerical value of the frequency range of the NR system may be changed. For example, FR1 may include a band of 410 MHz to 7125 MHz as shown in Table 5 below. That is, FR1 may include a frequency band of 6 GHZ (or 5850, 5900, 5925 MHz, etc.) or higher. For example, the frequency band of 6 GHz (or 5850, 5900, 5925 MHz, etc.) or higher included in FR1 may include an unlicensed band. The unlicensed band may be used for various purposes, for example, for communication for a vehicle (e.g., autonomous driving).

TABLE 5

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHZ | 60, 120, 240 kHz |

In an NR system, OFDM (A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
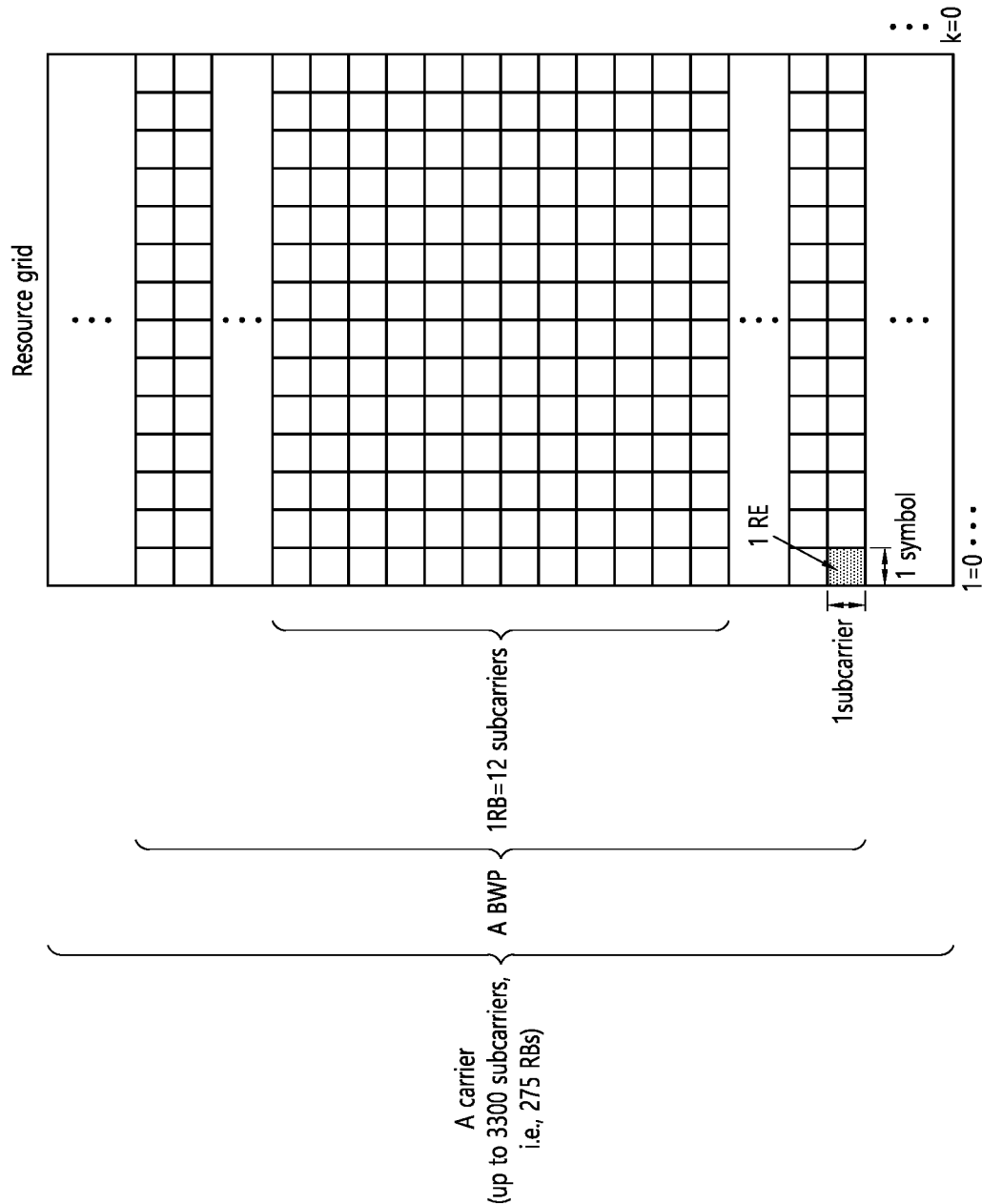
FIG. 7 illustrates a slot structure.

FIG. 7 illustrates a slot structure.

Referring to FIG. 7, a slot includes a plurality of symbols in a time domain. For example, in case of a normal CP, one slot may include 14 symbols. However, in case of an extended CP, one slot may include 12 symbols. Alternatively, in case of the normal CP, one slot may include 7 symbols. However, in case of the extended CP, one slot may include 6 symbols.

A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (P) RBs in the frequency domain, and the BWP may correspond to one numerology (e.g., SCS, CP length, and so on). The carrier may include up to N (e.g., 5) BWPs. Data communication may be performed through an activated BWP. Each element may be referred to as a resource element (RE) within a resource grid, and one complex symbol may be mapped thereto.

A physical downlink control channel (PDCCH) may include one or more control channel elements (CCEs) as illustrated in the following table 6.

TABLE 6

| Aggregation level | Number of CCEs |
| --- | --- |
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

A new unit called a control resource set (CORESET) may be introduced in the NR. The UE may receive a PDCCH in the CORESET.

Hereinafter, an integrated access and backhaul link (IAB) will be described. Meanwhile, hereinafter, for convenience of description, a proposed method will be described based on a new RAT (NR) system. However, the range of the system to which the proposed method is applied is expandable to other systems such as 3GPP LTE/LTE-A systems in addition to the NR system.

The following terms may be used in the present disclosure.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 8:
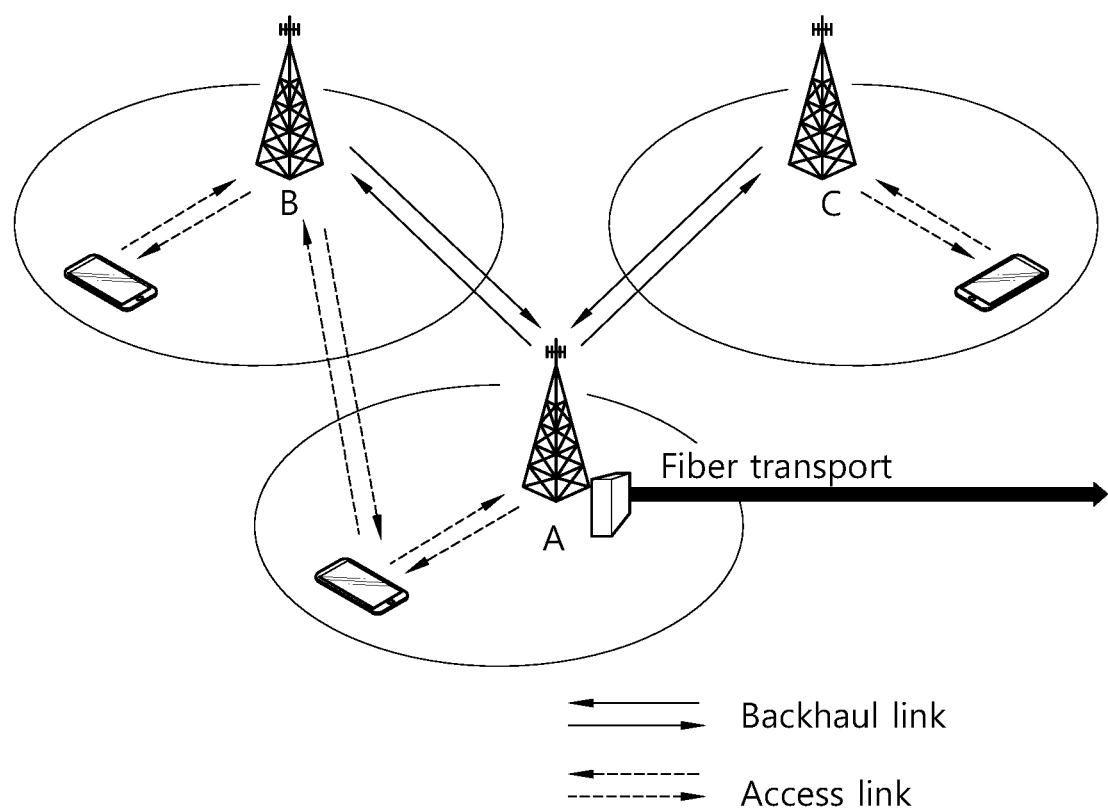
FIG. 8 schematically illustrates an example for a network with integrated access and backhaul links (IAB).

FIG. 8 schematically illustrates an example for a network with integrated access and backhaul links (IAB).

According to FIG. 8, relay nodes (rTRPs) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Although efficient support of out-of-band relays is important for some NR deployment scenarios, it is very important to understand the requirements of in-band operation, which implies tight interworking with access links operating on the same frequency to accommodate duplex restrictions and avoid/mitigate interference.

Furthermore, operating an NR system in the millimeter wave spectrum have some unique challenges. It involves experiencing severe short-term blocking that cannot be easily mitigated by the current RRC-based handover mechanism due to the larger time scale required for completion of the procedure compared to short blocking. Overcoming short blocking in mmWave systems may require a fast RAN-based mechanism for switching between rTRPs that does not necessarily require the inclusion of a core network. The aforementioned need for mitigation of short blocking for NR operation in the millimeter wave spectrum, along with the need for easier deployment of self-backhauled NR cells, creates a need for the development of an integrated framework that allows for fast switching of access and backhaul links. Over-the-air (OTA) coordination between rTRPs may also be considered to mitigate interference and support end-to-end path selection and optimization.

The following requirements and aspects shall be addressed by the IAB for NR:

Efficient and flexible operation for in-band and out-of-band relaying in indoor and outdoor scenarios Multi-hop and redundant connections End-to-end path selection and optimization Support of backhaul links with high spectral efficiency Support of legacy NR UEs Legacy NR is designed to support half-duplex devices. As such, half-duplex may be supported and worthy of being targeted in an IAB scenario. Furthermore, IAB devices having a full duplex may also be considered.

Figure 9:
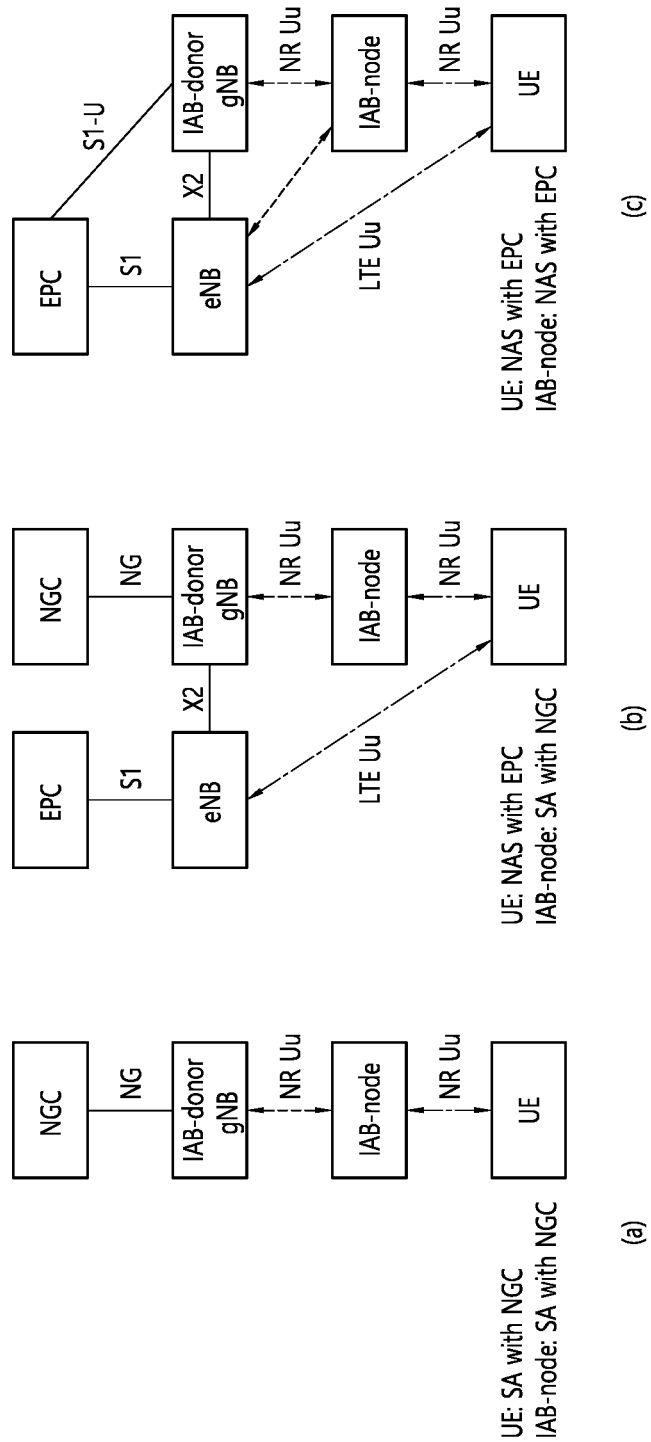
FIG. 9 shows an example of the operation of the IAB system in a standalone (SA) mode and a non-standalone (NSA) mode.

FIG. 9 shows an example of the operation of the IAB system in a standalone (SA) mode and a non-standalone (NSA) mode. Specifically, (a) of FIG. 9 shows an example of the operation of the UE and IAB node considering NGC in SA mode, (b) of FIG. 9 shows an example of the operation of the IAB node considering NGC in SA mode and the UE considering EPC in NSA mode, (c) of FIG. 9 shows an example of the operation of the UE and IAB node considering EPC in the NSA mode.

The IAB node may operate in SA mode or NSA mode. When operating in NSA mode, the IAB node uses only the NR link for backhauling. A UE connected to the IAB node may select an operation mode different from that of the IAB node. The UE may further connect to a different type of core network than the connected IAB node. In this case, (e) DECOR ((enhanced) dedicated core network) or slicing may be used for CN selection. An IAB node operating in NSA mode may be connected to the same or different eNB(s). UEs operating in the NSA mode may be connected to the same or different eNB from the IAB node to which they are connected. FIG. 9 shows an example in consideration of NGC in SA mode and an example in consideration of EPC in NSA mode.

In the IAB scenario, if each relay node (RN) does not have the scheduling capability, the donor gNB (DgNB) shall schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 10:
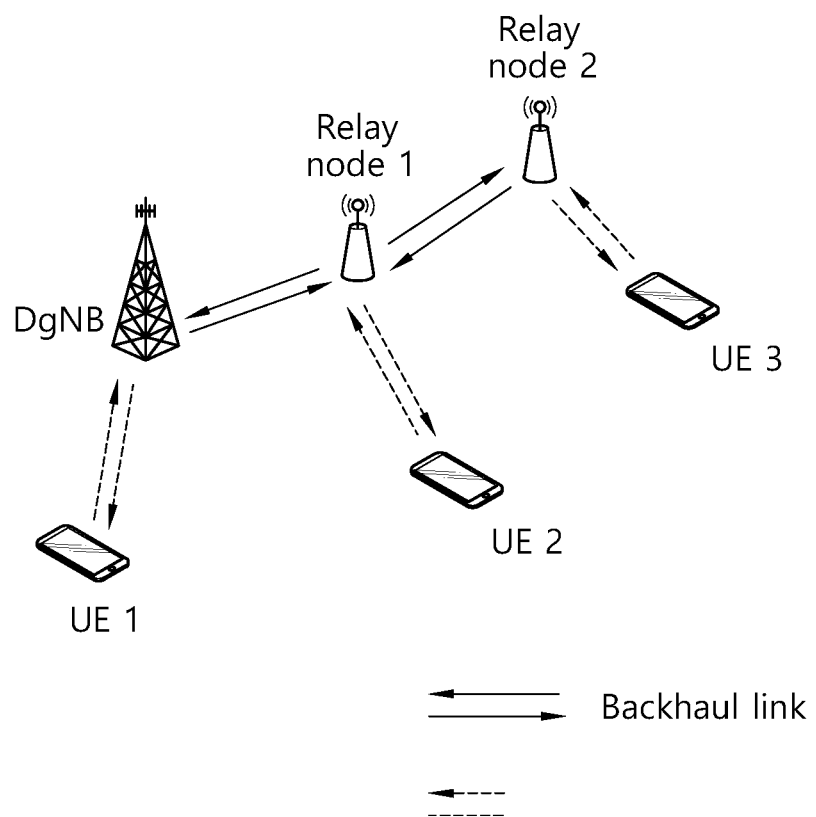
FIG. 10 schematically illustrates an example of a configuration of access and backhaul links.

FIG. 10 schematically illustrates an example of a configuration of access and backhaul links.

FIG. 10 shows an example in which a backhaul link and an access link are configured when a DgNB and an IAB relay node (RN) are present. The DgNB and RN1 connect the backhaul link, and RN2 connects the backhaul link to the RN1. The DgNB and UE1 connect the access link, the RN1 and UE2 connect the access link, and the RN2 and UE3 connect the access link.

According to FIG. 10, the DgNB not only receives a scheduling request from the UE 1, but also receives scheduling requests from the UE 2 and UE 3. Then, the DgNB makes a scheduling decision of the two backhaul links and the three access links, and informs the scheduling results. Therefore, such centralized scheduling involves scheduling delays and causes latency problems.

On the other hand, distributed scheduling can be performed if each relay node has scheduling capability. Then, immediate scheduling for the uplink scheduling request of the UE can be performed, and the backhaul/access links can be used more flexibly by reflecting the surrounding traffic situation.

Figure 11:
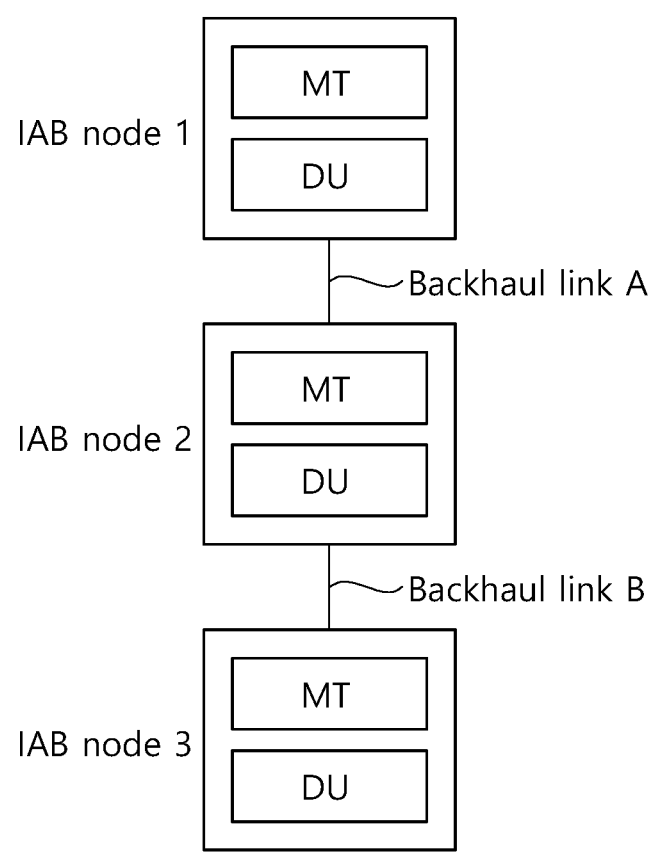
FIG. 11 explains links and relationships between IAB nodes.

FIG. 11 explains links and relationships between IAB nodes.

Referring to FIG. 11, IAB node 1 is connected to IAB node 2 through a backhaul link A. For the backhaul link A, the IAB node 1 is the parent node of the IAB node 2, and the IAB node 2 is a child node of the IAB node 1. In addition, the IAB node 2 is connected to the IAB node 3 through a backhaul link B, and the IAB node 2 is a parent node of the IAB node 3 and the IAB node 3 is a child node of the IAB node 2 for the backhaul link B.

Here, each of the IAB nodes may perform two functions. One is Mobile Termination (MT), which maintains a wireless backhaul connection to an upper IAB node or donor node. And, the other is a DU (distributed unit), which provides access connection with UEs or connection with the MT of a lower IAB node.

For example, from the point of view of the IAB node 2, the DU of IAB node 2 is functionally connected to the MT of IAB node 3 on the backhaul link B, and at the same time, the MT of IAB node 2 is functionally connected to the DU of IAB node 1 on the backhaul link A. Here, the child link of the DU of IAB node 2 may mean the backhaul link B between the IAB node 2 and IAB node 3. Also, here, the parent link of the MT of the IAB node 2 may mean the backhaul link A between the IAB node 2 and the IAB node 1.

Meanwhile, from the perspective of the IAB node MT (or simply MT), the following time domain resources may be indicated for the parent link.

Downlink (DL) time resource
Uplink (UL) time resource
Flexible (F) time resource
From the point of view of the IAB node DU (or simply DU), a child link has the following time resource types.
Downlink (DL) time resource
Uplink (UL) time resource
Flexible (F) time resource
Not-available (NA) time resources (resources not used for communication on the DU child link)

Meanwhile, each of the downlink time resource, uplink time resource, and flexible time resource of the DU child link may belong to one of the following two categories.

Hard resource: this is always available time resource for DU child link
Soft resource: this is a resource in which the availability of the time resource for the DU child link is explicitly or implicitly controlled by the parent node Meanwhile, the foregoing is only an arbitrary classification, resource types from the viewpoint of the IAB node DU are the UL, the DL, and the F, and configurations for availability may be classified into the NA, the hard resource, and the soft resource, respectively. Specifically, the IAB node may receive resource configuration information, where the resource configuration information may include link direction information and availability information. Here, the link direction information may inform whether the type of a specific resource is the UL, the DL, or the F, and the availability information may inform whether a specific resource is the hard resource or the soft resource. Alternatively, the link direction information may inform whether the type of a specific resource is the UL, the DL, the F, or the NA, and the availability information may inform whether a specific resource is the hard resource or the soft resource.

Meanwhile, the following transmission timing alignment case across an IAB node and an IAB donor is discussed.

Case 1: DL transmission timing alignment across the IAB node and the IAB donor: If a downlink transmission and an uplink reception are not well aligned at the parent node, the child node needs additional information related to the alignment to properly configures its downlink transmission timing for OTA-based timing and synchronization.

Case 2: Downlink and uplink transmission timing is aligned for one IAB node.

Case 3: Downlink and uplink reception timings are aligned for one IAB node.

Case 4: For one IAB node, a case where Case 2 is used for transmission when Case 3 is used for reception.

Case 5: Case 4 for backhaul link timing for one IAB node in different time slots and Case 1 for Access Link Timing.

Case 6: Sum of the downlink transmission timing of Case 1 and the uplink transmission timing of Case 2: The downlink transmission timing of all IAB nodes is aligned with the downlink timing of the parent IAB node or donor; Uplink transmission timing of the IAB node may be aligned with downlink transmission timing of the IAB node.

Case 7: Sum of the downlink transmission timing of Case 1 and the uplink reception timing of Case 3: The downlink transmission timing of all IAB nodes is aligned with the downlink timing of the parent IAB node or donor; Uplink reception timing of the IAB node may be aligned with downlink reception timing of the IAB node; If downlink transmission and uplink reception are not well aligned at the parent node, the child node needs additional information related to the alignment to properly configure its own downlink transmission timing for OTA-based timing and synchronization.

In the following, the proposal of the present disclosure will be described in more detail.

The following drawings are made to explain a specific example of the present specification. Since the names of specific devices or names of specific signals/messages/fields described in the drawings are provided as examples, the technical features of the present specification are not limited to the specific names used in the drawings below. In addition, the methods/configurations proposed in this specification may be combined in various ways.

Meanwhile, as described above, in the present specification, the IAB node DU and the IAB node MT may be expressed as DU and MT, respectively. Also, in the present specification, a child node MT connected to an IAB node DU may be expressed as a child MT. At this time, in this specification, the IAB node DU may be expressed as a parent DU.

The IAB node operates based on specific transmission/reception timing at a specific point in time, but may use other transmission/reception timing depending on time/circumstances. In this specification, an IAB node proposes an operation in which different transmission/reception timings are applied according to time/circumstances.

Hereinafter, an operation of an IAB DU having a plurality of reception timings will be described.

A plurality of child MTs/UEs may be connected to a DU (a donor node or a DU of an IAB node). In this case, link(s) for different child MTs/UEs may be classified as different child links. In the case of an existing DU, uplink reception timing is fixed to a specific timing, and uplink reception timing for all child links may be configured to align. To this end, the DU may configure a TA for its child MT/UE so that uplink reception timings for a plurality of child links can be aligned.

Meanwhile, in this specification, timing advance (TA) or TA value may refer to a parameter or value used when determining an uplink transmission timing by advancing from a downlink reception timing.

On the other hand, in the case of an enhanced IAB node, all child links may not have the same uplink reception timing. An example of a specific situation in which the uplink reception timing may be different for each child link is as follows.

(Example 1) When timing alignment Case 6 (transmission timing alignment) is applied to the child node, the uplink transmission timing of the child MT is aligned with the downlink transmission timing of the child DU. In this case, the uplink reception timing of the DU may be determined based on a propagation delay between the DU and the child node. Accordingly, uplink reception timings of DUs may be different between uplink signals transmitted by child MTs having different propagation delays.

(Example 2) When Cases of timing alignment applied to each child node are different, uplink reception timings for DUs may be different based on child MTs. For example, when a first child node uses timing alignment Case 1 and a second child node uses timing alignment Case 6, a first child node may determine uplink transmission timing based on the configured TA, and a second child node may determine uplink transmission timing according to its own downlink transmission timing. Accordingly, uplink reception timings of DUs for each of uplink signals transmitted by the first child MT and the second child MT may be different from each other.

(Example 3) Uplink reception timings of DUs may be different depending on the capabilities of child nodes. For example, when attempting to match its uplink reception timing so that timing alignment Case 7 can be applied to the DU, the first child MT, which is an advanced IAB node, may determine the uplink transmission timing by adjusting the TA value based on the corresponding uplink reception timing. In this case, the TA value becomes a negative number, so that the uplink transmission timing of the first child MT may be located later than the downlink reception timing. Another child link of the DU may be a link with a second child MT that is an access UE or a legacy IAB node. In this case, since the access UE or the second child MT does not have the ability to configure a TA having a negative value, the uplink transmission timing may always be prior to the downlink reception timing. In this case, uplink reception timings of DUs for an uplink signal transmitted by the first child MT and an uplink signal transmitted by the access UE or the second child MT may be different from each other.

In this specification, when uplink reception timings are different for each child link of a DU, an operation of an IAB node is proposed. In this specification, a child MT may mean an MT of a child node or an access UE.

Figure 12:
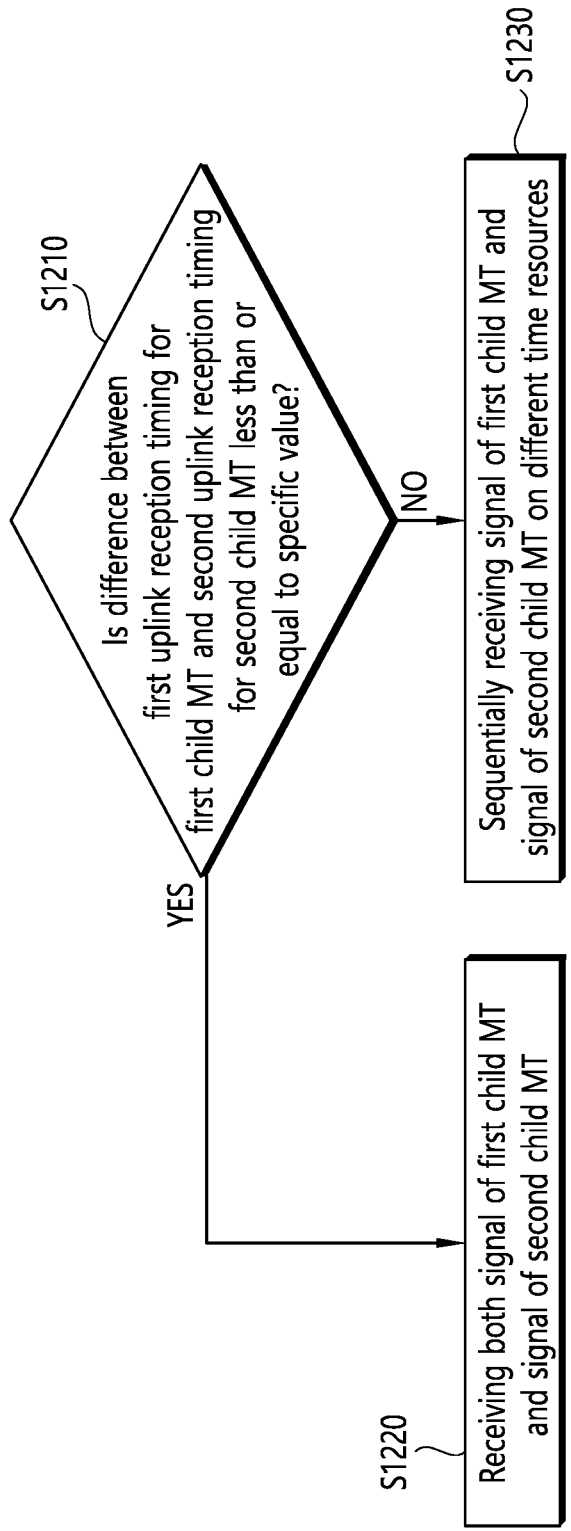
FIG. 12 shows an example of an operation of an IAB node when uplink reception timing may be different for each child link of a DU.

FIG. 12 shows an example of an operation of an IAB node when uplink reception timing may be different for each child link of a DU.

Referring to FIG. 12, a plurality of child MTs, for example, a first child MT and a second child MT may be connected to the IAB node. At this time, the IAB node determines whether a difference between a first uplink reception timing for the first child MT and a second uplink reception timing for the second child MT is less than or equal to a specific value (S1210).

As a result of the determination, when the difference between the first uplink reception timing and the second uplink reception timing is less than or equal to the specific value, both the signal of the first child MT and the signal of the second child MT are received within the same time resource (S1220). Here, in the IAB node, the first child MT and the second child MT may be managed as the same child MT group.

On the other hand, as a result of the determination, when a difference between the first uplink reception timing and the second uplink reception timing is greater than the specific value, the signal of the first child MT and the signal of the second child MT are sequentially received on different time resources (S1230). For example, when there is a first time resource and a second time resource that are time division multiplexed (TDM), a signal of the first child MT may be received in the first time resource, and a signal of the second child MT may be received in the second time resource. The IAB node may manage the first child MT and the second child MT as different child MT groups. For example, the first child MT may be managed as a first child MT group, and the second child MT may be managed as a second child MT group. The IAB node may configure an independent timing advance (TA) value for each child MT group.

The specific value may be configured by the network (e.g., configured by the donor node of the IAB node through an RRC message or DCI) or may be a predetermined value.

Figure 13:
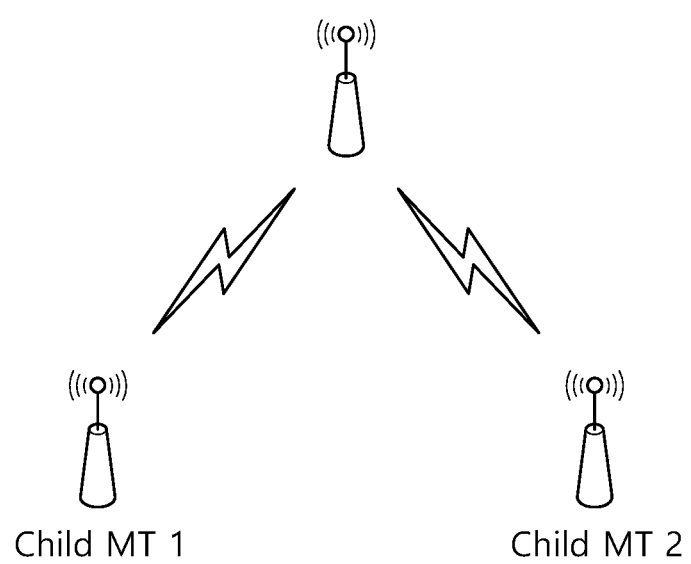
FIG. 13 schematically shows an IAB node connected with two child nodes.
Figure 14:
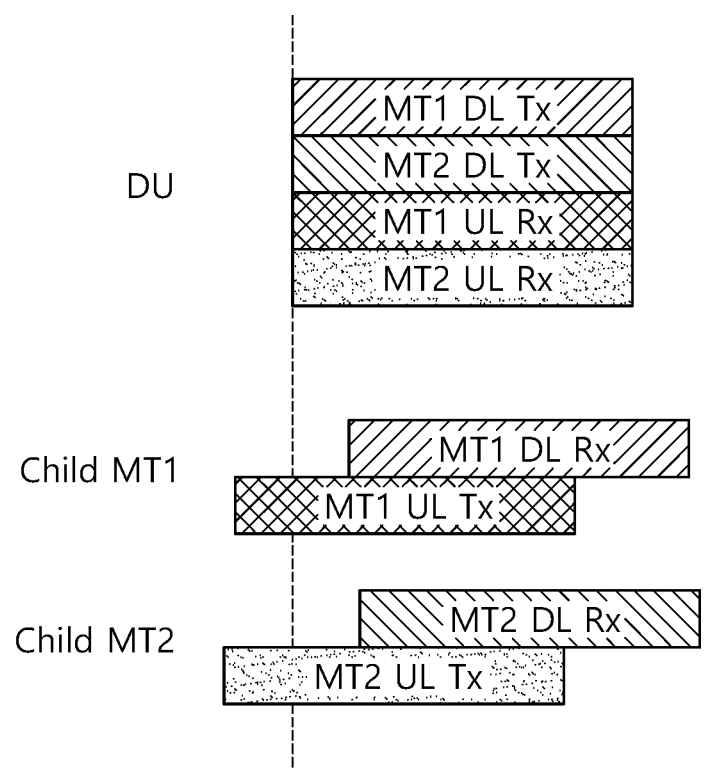
FIG. 14 schematically illustrates an example of transmission/reception timing of an IAB node and two child nodes connected to the IAB node.
Figure 15:
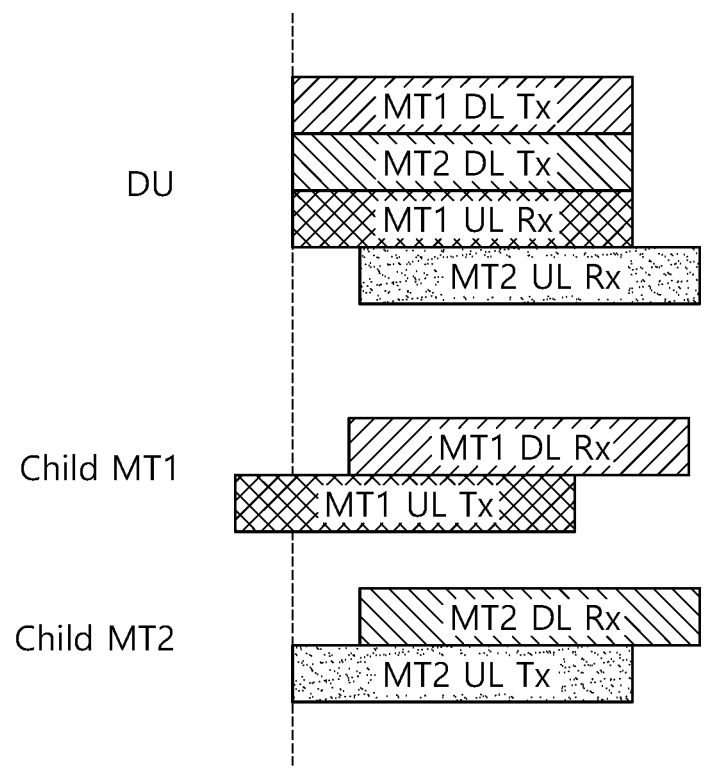
FIG. 15 schematically illustrates another example of transmission/reception timing of an IAB node and two child nodes connected to the IAB node.

Hereinafter, the methods proposed in this specification will be described in detail with reference to FIG. 13 to FIG. 15. FIG. 13 schematically shows an IAB node connected with two child nodes. FIG. 14 schematically illustrates an example of transmission/reception timing of an IAB node and two child nodes connected to the IAB node. FIG. 15 schematically illustrates another example of transmission/reception timing of an IAB node and two child nodes connected to the IAB node.

The IAB node DU can receive uplink signals transmitted by child links having the same or similar uplink reception timing through the same time resource. If a difference between uplink reception timings for each uplink signal transmitted by different child links is large, all uplink signals may not be successfully received.

Referring to FIG. 13, when the IAB node DU has MT1 and MT2 as child node MTs, as shown in FIG. 14, as shown in FIG. 14, when the uplink reception timing for child MT1 and the uplink reception timing for child MT2 match each other or the difference is less than a specific value, the DU can receive both uplink signals. However, as shown in FIG. 15, if the difference between the uplink reception timing for child MT1 and the uplink reception timing for child MT2 is greater than a specific value, the DU may not be able to receive both uplink signals.

Therefore, it is preferable that the DU simultaneously receives uplink signals of child links whose uplink reception timings match each other or whose timing difference is less than a specific value, and the DU receives uplink signals of child links having a difference in uplink reception timing greater than a specific value through different time resources.

Hereinafter, the operation of the IAB MT having a plurality of transmission timings will be described.

An IAB node may use a different DU/MT transmission/reception timing alignment method than legacy IAB nodes. Whereas a legacy IAB node performs timing alignment using timing alignment Case 1, an enhanced IAB node may perform timing alignment using timing alignment Case 6 or Case 7.

In order for the IAB node to apply the timing alignment Case 6 or Case 7, the IAB node is configured to apply the corresponding timing alignment case from the parent DU/CU (central unit), and if necessary, additional information to apply the timing alignment case may need to be configured. In this case, when the IAB node initially accesses the parent DU or determines that the RRC configuration is invalid, it may have to assume a default timing alignment case for its operation. This default timing alignment case may be the same as timing alignment Case 1. In this case, uplink transmission timing in which the MT performs uplink transmission to the parent DU may be applied differently depending on circumstances.

As described above, from the viewpoint of the parent DU, all child links may not have the same uplink reception timing. The IAB node DU can receive uplink signals transmitted by child links having the same or similar uplink reception timing through the same time resource. If a difference between uplink reception timings of respective uplink signals transmitted by different child links is large, the IAB node may not be able to successfully receive all uplink signals. Therefore, it is preferable that the DU simultaneously receives uplink signals of child links whose uplink reception timings match each other or whose timing difference is less than a specific value, and the DU receives uplink signals of child links having a difference in uplink reception timing greater than a specific value through different time resources. In this case, the DU groups child MTs to receive uplink channels/signals of child links whose uplink reception timings match each other or whose timing difference is less than a specific value through the same time resource, and other (e.g., the difference is greater than or equal to a specific value) child MTs having uplink reception timings may transmit uplink channels/signals with different time resources. That is, a plurality of uplink reception timings exist from the viewpoint of a specific parent DU, and a specific uplink reception timing may be applied in a specific time resource. For example, the DU may receive an uplink signal by applying uplink reception timing 1 in time resource group 1, and may receive an uplink signal by applying uplink reception timing 2 in time resource group 2. In this case, when a child MT transmits an uplink signal to a DU by applying a specific uplink transmission timing, uplink transmission should be performed only within a specific time resource group. If the corresponding child MT wants to perform uplink transmission through another time resource group, uplink transmission should be performed according to the uplink reception timing applied by the DU in the corresponding time resource group. In this case, the MT may perform uplink transmission by applying different uplink transmission timing according to time resources.

As described above, from the viewpoint of a specific MT, uplink transmission may be performed by applying different uplink transmission timings according to situations/times. That is, when the MT configures its uplink transmission timing as 'downlink reception timing $-(TA+TA_{offset})$' or 'downlink reception timing–TA', The MT may perform uplink transmission by having a plurality of TA values and applying different TA values according to situations/times.

In this specification, a specific method for performing uplink transmission by applying different TA values according to a situation/time in which the MT has a plurality of (e.g., two) TA values is proposed.

Hereinafter, the type of TA applied by the MT is proposed.

A default TA and a dedicated TA may be considered as TA values applied to decide/determine its own uplink transmission timing from the point of view of a specific MT. Hereinafter, the default TA will be described.

The default TA may mean a TA value corresponding to when an IAB node configures an uplink transmission timing like a legacy IAB node or UE. Alternatively, the default TA may mean a TA value configured according to the reception timing of an uplink signal received from the access UE/legacy MT from the viewpoint of the parent DU. At this time, if different child MTs perform uplink transmissions using their default TAs, uplink transmissions transmitted by child MTs can be received at the same timing from the viewpoint of a DU.

Hereinafter, the dedicated TA will be described.

The dedicated TA may refer to a corresponding TA value when an IAB node configures an uplink transmission timing in a method different from that of a legacy IAB node or UE. Alternatively, from the perspective of the parent DU, the dedicated TA may mean a TA value configured according to an uplink reception timing different from the reception timing of an uplink signal received from an access UE/legacy MT. At this time, if different child MTs perform uplink transmissions using their own dedicated TAs, the DU may receive uplink transmissions transmitted by the child MTs at the same or different timing.

For example, the default TA and the dedicated TA may be independently configured through a MAC control element (MAC CE). At this time, from the viewpoint of the MT, the existing TA configuration is the default TA, and a dedicated TA may be additionally configured for the MT.

In detail, a plurality of dedicated TAs may be configured for one MT. In this case, one dedicated TA may be applied at a specific uplink transmission time point.

Hereinafter, a method of applying TA during uplink transmission of MT will be described.

Specifically, the IAB MT proposes to perform an uplink transmission by applying a default TA and a dedicated TA as follows. In order to determine the TA value used by the MT, one or more of the following contents may be applied. In the following contents, the default TA and the dedicated TA may be interpreted by replacing them with TA values TA1 and TA2 that may have different values.

For example, the MT may perform uplink transmission using a default TA until a dedicated TA value is configured upon initial access to a DU/cell. Then, when a dedicated TA value is configured for the MT, the MT can perform an uplink transmission using the dedicated TA value.

For example, when the MT is in the RRC inactive (RRC_INACTIVE) and/or RRC idle (RRC_IDLE) states, the MT may determine that the dedicated TA value is not valid and apply the default TA value to perform an uplink transmission. When the MT transitions from the RRC_INACTIVE and/or RRC_IDLE state to the RRC connected (RRC_CONNECTED) state, the MT may perform an uplink transmission using the latest dedicated TA value. Or, when the MT transitions from the RRC_INACTIVE and/or RRC_IDLE state to the RRC connected (RRC_CONNECTED) state, the MT may first apply a default TA value, and then perform an uplink transmission using the dedicated TA value after a new dedicated TA value is configured for the MT. Alternatively, when the MT switches from the RRC_INACTIVE state to the RRC_CONNECTED state, the MT may perform an uplink transmission using the latest dedicated TA value, when the MT transitions from the RRC_IDLE state to the RRC_CONNECTED state, the MT may apply a default TA value, and when a new dedicated TA value is configured for the MT, the MT may perform an uplink transmission using the corresponding dedicated TA value.

Meanwhile, in the present specification, the RRC_IDLE state may be a state in which a radio connection (RRC connection) between a base station and a UE is not established. In addition, the RRC_INACTIVE state may be a state in which a radio connection (RRC connection) is established between the base station and the UE, but the radio connection is deactivated. In addition, the RRC_CONNECTED state may be a state in which the radio connection (RRC connection) is established between the base station and the UE.

As another example, the TA value applied may be different depending on the type of channel/signal through which the MT performs an uplink transmission.

In order for the parent DU to manage the default TA value of the MT, transmission of a specific uplink signal may be performed using the default TA. The MT performs an uplink transmission by applying a dedicated TA value, but a transmission of a specific uplink signal/channel may be performed using a default TA. For example, the MT performs uplink transmission by applying a dedicated TA value, but exceptionally, a sounding reference signal (SRS) may be transmitted using a default TA.

Alternatively, a semi-static uplink signal/channel (e.g., SRS, SR (scheduling request), SPS-PUSCH (semi-persistent scheduling-physical uplink shared channel), PRACH) that is configured and transmitted as RRC (physical random access channel)) may be transmitted with a default TA applied, and an uplink signal/channel that is dynamically scheduled and transmitted by DCI may be transmitted with a dedicated TA applied.

Characteristically, when transmission of a semi-static uplink signal/channel is configured with the RRC, applied TA information may be configured together. For example, when transmission of a semi-static uplink signal/channel is configured with the RRC, whether to perform transmission using a default TA or a dedicated TA value may be configured together.

As another example, TA information applied to the uplink transmission may be indicated together through DCI. For example, a field indicating whether transmission is performed using a default TA or a dedicated TA value may be included in the DCI. When the MT receives the DCI and performs an uplink transmission scheduled by the DCI, it can apply TA information indicated through the DCI. If such TA information is included in an uplink grant, the MT may apply the corresponding TA value when transmitting the scheduled PUSCH. On the other hand, if such TA information is included in a downlink grant, the MT may apply the corresponding TA value when transmitting a PUCCH containing acknowledgment/negative-acknowledgement (A/N) information for the scheduled PDSCH.

As another example, a TA value applied to uplink transmission may be different depending on the type of DCI received by the MT.

Specifically, whether the DCI received by the MT is a fallback DCI (e.g., DCI format 0_0, DCI format 1_0, etc.) or a non-fallback DCI (e.g., DCI format 0_1, DCI format 1_1) etc.), the applied TA value may be different. When the MT receives the fallback DCI, a default TA value may be applied to related uplink transmissions (i.e., PUSCH and PUCCH). On the other hand, when the MT receives the non-fallback DCI, a dedicated TA value may be applied to related uplink transmissions (i.e., PUSCH and PUCCH).

As another example, a TA value applied to an uplink transmission may be different depending on a resource through which the DCI received by the MT is transmitted.

In detail, a TA value applied to an uplink transmission may be different depending on the CORESET where the DCI received by the MT is located. For example, in the case of DCI transmitted through a search space associated with CORESET 1, a default TA value is applied to a related uplink transmission (i.e., PUSCH and PUCCH), in the case of DCI transmitted through a search space associated with CORESET 2, a dedicated TA value may be applied to a related uplink transmission (i.e., PUSCH and PUCCH).

Alternatively, a TA value applied to an uplink transmission may be different according to a search space where the DCI received by the MT is located. For example, in the case of DCI transmitted through search space 1, a default TA value is applied to a related uplink transmission (i.e., PUSCH and PUCCH), and in the case of DCI transmitted through a search space associated with search space 2, a dedicated TA value may be applied to a related uplink transmission. For another example, in the case of DCI transmitted through a common search space (CSS), a default TA value is applied to a related uplink transmission, in the case of DCI transmitted through a UE-specific search space (USS), a dedicated TA value may be applied to a related uplink transmission.

As another example, a TA value applied by the MT may be different according to a time resource in which uplink transmission is performed.

In detail, the MT may receive time resource information for operating as a dedicated TA from a parent DU or from a CU/donor node. At this time, the MT may perform an uplink transmission with the dedicated TA in the configured time resource and perform an uplink transmission with the default TA in the remaining resources.

Alternatively, the MT may receive time resource information operating as a default TA from the parent DU or CU/donor node. In this case, the MT may perform an uplink transmission using the default TA in the configured time resource and performing an uplink transmission using the dedicated TA in the remaining resources.

Alternatively, the MT may receive time resource information operating as a default TA and time resource information operating as a dedicated TA from the parent DU or CU/donor node, respectively. In this case, the MT may perform an uplink transmission with the default TA in the time resource operating as the default TA, and perform an uplink transmission with the dedicated TA in the time resource operating as the dedicated TA.

Even when there are a plurality of types of TA values that can be applied by the MT during the uplink transmission, the above content can be extended and applied. In this case, different TA values may be applied when the MT transmits uplink according to the above conditions.

Hereinafter, priorities among uplink transmissions transmitted by applying different TAs will be described.

For example, when MTs apply different TA values to different uplink transmissions, time resources of two uplink transmissions may overlap. Alternatively, since a certain amount of time is consumed to change the TA value applied by the MT, sufficient time for changing the TA value may not be guaranteed even if time resources of two uplink transmissions do not overlap. For example, although the MT needs two symbols to change the TA value, the MT's PUSCH transmission symbol resource and SRS transmission symbol resource may be located contiguously. In this case, since the MT cannot perfectly perform both uplink transmissions, one of the two transmissions can be performed first. Below, specific measures for this are proposed.

As an example, dynamic uplink transmission (e.g., dynamically scheduled uplink transmission through DCI) compared to semi-static uplink transmission (e.g., semi-statically configured uplink transmission through RRC configuration) may have a higher priority.

As another example, a priority of uplink transmission may be determined based on a time point when a message for configuring/instructing the uplink transmission is received. For example, uplink transmission for which scheduling is configured/instructed relatively recently or relatively later may have a higher priority.

As another example, the priority of uplink transmission may be determined based on the timing of performing the uplink transmission. For example, an uplink transmission scheduled to be transmitted relatively first may have a higher priority. Alternatively, an uplink transmission scheduled to be transmitted relatively later may have a higher priority.

As another example, the priority may be determined based on a TA value applied to the uplink transmission. For example, an uplink transmission using a default TA may have a higher priority over an uplink transmission using a dedicated TA. Alternatively, an uplink transmission using a dedicated TA may have a higher priority over an uplink transmission using a default TA.

On the other hand, in the above content, the expression that A's transmission has a higher priority over B's transmission may mean the following.

For example, the MT may perform A's transmission and not perform B's transmission by dropping it.

As another example, the MT may perform A's transmission, and may not perform B's transmission by puncturing the B's transmission in a transmission resource of B in which the B's transmission cannot be performed for the A's transmission. Here, the B's transmission can be performed in the transmission resource of B which is available for the B's transmission.

Hereinafter, a plurality of transmission timings having a plurality of carriers will be described.

In the following content, UE/terminal may be applied by replacing the IAB node MT. Alternatively, the following content may not be applied to the UE/terminal but may be applied only to the IAB node MT.

Meanwhile, a timing advance group (TAG) may be defined as follows.

A TAG (TA group) consists of one or more serving cells with the same uplink TA and same downlink timing reference cell. pTAG is a TAG containing PCell. The UE uses PCell as timing reference for pTAG. sTAG is a TAG contains only SCells(s). The UE may use any of the activated SCells of this TAG as a timing reference cell, but should not change it unless necessary. Here, the downlink timing reference cell may mean a reference cell for time synchronization.

When a plurality of serving cells are configured for a UE in an environment such as carrier aggregation (CA), the different serving cells may belong to the same or different TAGs. For the serving cell within the same TAG, the UE may perform an uplink transmission by dedicating the same uplink TA value.

Meanwhile, as described above, when the UE operates with two or a plurality of TA values for one serving cell, it is necessary to consider operation in a plurality of serving cell environments.

As described above, the plurality of TA values applied by the UE to one serving cell have different values, but may be determined based on the same downlink timing. For example, when a default TA and a dedicated TA are TA1 and TA2, respectively, the uplink transmission timing based on TA1 is determined as 'downlink reception timing-TA1', and the uplink transmission timing based on TA2 may be determined as 'downlink reception timing-TA2'. In this case, the downlink reception timing for determining the two uplink transmission timings may mean the same timing.

In this specification, a TA application method is proposed when such a plurality of TAs are applied in a plurality of serving cell environments, that is, when TA1 and TA2 can be used in a plurality of serving cells. For example, a UE may have a cell A, a cell B, and a cell C as serving cells, and the corresponding cells may belong to the same TAG. At this time, when the UE can perform an uplink transmission using two TA values, TA1 and TA2, in cell A, it is necessary to consider a method of applying TA(s) in cell B and cell C.

In other words, the transmission timing of the IAB node may be changed according to the operation method of the IAB node. Specifically, in the IAB system, the timing at which the IAB node performs an uplink transmission to the parent node may be changed due to timing alignment for simultaneous transmission of the IAB node MT and the IAB node DU. In this case, a plurality of transmission timings may be configured to the IAB node.

In this regard, since the existing TAG is defined on the premise of the same downlink timing reference cell and the same uplink TA, the definition of the TAG in the IAB system needs to be changed. For example, a TAG in an IAB system may be composed of serving cells having different uplink TAs. In this case, transmission timings between serving cells may be different.

Hereinafter, a method of always applying the same TA to serving cells within a TAG will be described.

TA value(s) supported by serving cells within the same TAG may always be the same. That is, the UE can apply the same one TA value to all serving cells in the same TAG or the same two or multiple TA values to all serving cells in the same TAG. That is, two or more TA values can be applied to all serving cells in the same TAG. For example, when a cell A, a cell B, and a cell C belong to one TAG, two TA values of TA1 and TA2 may be applied to all of cell A, cell B, and cell C.

For example, when multiple TAs are applied to one serving cell, the multiple TA values may be applied at different times. For example, the UE may perform an uplink transmission by applying TA1 in continuous/non-contiguous time interval 1, and may perform an uplink transmission by applying TA2 in continuous/non-contiguous time interval 2 that does not overlap with time interval 1.

In this case, among a plurality of available (set) TA values for serving cells within the same TAG, a TA value applied at the same time point may be the same for all serving cells. That is, for serving cells within the same TAG, the UE can perform an uplink transmission by applying the same TA value among a plurality of (set) TA values available at the same time point. For example, when the UE can perform an uplink transmission by applying TA1 or TA2 to a cell A, a cell B, and a cell C within the same TAG, the UE may have the same TA value applied for the uplink transmission among TA1 and TA2 for all serving cells at the same time point. In this case, when the UE simultaneously performs simultaneous uplink transmission to a plurality of serving cells, transmission may be performed with the same TA value always applied.

For example, when receiving transmission timing information according to time from a gNB for a specific serving cell, for a plurality of serving cells belonging to the same TAG, it can be assumed that only a representative serving cell (e.g., a downlink timing reference cell) receives corresponding information, and other serving cells apply the same configuration.

Hereinafter, a method of applying different TAs to serving cells within a TAG at the same time point will be described.

TA value(s) supported for serving cells within the same TAG may be different. In this case, among TA values supported in the TAG, only some TA values(s) may be used in some serving cells. For example, when two TA values, TA1 and TA2, are supported for a TAG, both TA1 and TA2 may be supported or only one TA value may be supported according to a serving cell included in the TAG. Alternatively, even if the TA value(s) supported for serving cells in the same TAG are the same, among a plurality of available (set) TA values, a TA value applied at the same time may be different depending on the serving cell.

In this case, when the UE needs to perform an uplink transmission through a plurality of serving cells at the same time point, TA values applied to the plurality of serving cells may not be the same. In this case, simultaneous transmission based on different uplink transmission timing may be difficult by applying different TAs according to the capabilities of the UE. In the case of such a UE, only transmission with the same uplink transmission timing can be performed at the same time, and when configured/scheduled to simultaneously perform the transmission with different uplink transmission timing applied, the following operation can be performed.

For example, when the uplink transmission needs to be performed simultaneously with different uplink transmission timings for a downlink timing reference cell and a cell other than the TAG, the transmission of the downlink timing reference cell may be prioritized. Therefore, the UE may perform an uplink transmission to which the same TA as the TA applied to the downlink timing reference cell is applied, and may not perform another uplink transmission by dropping it.

As another example, when a TA value applied to the uplink transmission to a plurality of serving cells is the aforementioned default TA or dedicated TA, priority can be given to an uplink transmission using the default TA. In this case, the UE may perform an uplink transmission to the serving cell(s) using the preferred default TA, and drop a non-preferred uplink transmission.

In this way, serving cells to which the same TA is applied at a specific time within the TAG can be classified as the same sub-TAG. That is, when TA1 and/or TA2 are applied to specific serving cells within a TAG, serving cells using TA1 at a specific time point may belong to sub-TAG1, and serving cells using TA2 may belong to sub-TAG2. In other words, the configuration of serving cells configuring the same TAG may vary depending on the TA used by the UE. That is, for a TAG ID, a serving cell configuring a TAG may be configured TA-specifically for a plurality of TA values. At this time, in the present specification, TAGs configured differently based on each TA may be expressed as different sub-TAGs.

In this case, considering the case where the TA applied to a specific serving cell changes over time, a specific serving cell may belong to one sub-TAG at a specific time point, and serving cells configuring each sub-TAG or each serving cell A sub-TAG to which a cell belongs may change over time.

In this case, the UE may perform an uplink transmission by applying the same TA to serving cells belonging to the same sub-TAG.

To this end, for example, the UE can determine sub-TAG information to which each serving cell belongs as follows.

For example, the UE may determine sub-TAG information based on a TA value applied to each serving cell without explicit instruction. If the UE knows a TA value applied to a specific serving cell at a specific time point, the UE may determine that serving cells to which the same TA is applied belong to the same sub-TAG.

Meanwhile, since different TAs are applied within the same TAG according to the capability of the UE, simultaneous transmission based on different uplink transmission timing may be difficult. Considering this case, the UE within the TAG may perform an uplink transmission by applying one TA value at a specific time point. Accordingly, the uplink transmission to serving cells belonging to the same sub-TAG among sub-TAGs can be simultaneously performed, but the uplink transmission to serving cells belonging to different sub-TAGs cannot be simultaneously performed. That is, when the UE is configured/scheduled to perform an uplink transmission on a plurality of serving cells belonging to the same sub-TAG in the same time support, the UE can simultaneously perform an uplink transmission on the corresponding serving cells. However, when the UE is configured/scheduled to perform an uplink transmission on serving cells belonging to different sub-TAGs in the same time resource, the UE may not be able to simultaneously perform an uplink transmission on the corresponding serving cells. In this case, uplink transmission may be performed as follows.

For example, when the uplink transmission needs to be performed on a downlink timing reference cell, the uplink transmission for serving cell(s) belonging to a sub-TAG including a timing reference cell may have a priority. In this case, the uplink transmission for serving cell(s) belonging to a sub-TAG that does not include a timing reference cell may be dropped and not performed.

As another example, when a TA value applied to an uplink transmission to a plurality of serving cells is the aforementioned default TA or dedicated TA, the uplink transmission to a sub-TAG using the default TA may have a higher priority. In this case, the UE performs an uplink transmission to the serving cell(s) belonging to the sub-TAG to which the default TA value is applied, and the uplink transmission to the serving cell(s) belonging to the non-preferred sub-TAG may be dropped and not performed.

In this case, serving cells in the same TAG may have the same downlink timing reference cell even though they belong to different sub-TAGs and have different uplink TAs. This is because an uplink timing to which different TAs are applied can be determined based on the same downlink timing. In this case, a downlink timing reference cell of a specific sub-TAG may have a cell not belonging to the sub-TAG as a downlink timing reference cell.

Hereinafter, a method of applying different TAs at the same time point using different TAGs will be described.

Meanwhile, in order to maintain the existing definition that the same uplink TA is applied to serving cells belonging to the same TAG, serving cells having different TAs may belong to different TAGs. That is, serving cells to which different TAs are applied may be configured to belong to different TAGs.

In this case, when another TA among a plurality of TAs can be applied to one serving cell according to time, the corresponding serving cell may belong to a plurality of TAGs. For example, a cell A, a cell B, and a cell C are configured as serving cells for the UE, the UE can perform an uplink transmission using TA1 and TA2 in the cell A, and when the UE applies TA1 and TA2 as uplink TAs in the cell B and the cell C, respectively, TAG1 may consist of the cell A and the cell B, and TAG2 may consist of the cell A and the cell C. However, since only one TA value is applied to one serving cell at the same time point, when one serving cell belongs to a plurality of TAGs, it is proposed that only one TAG be effective at a specific time point. That is, the cell A being included in TAG1 is effective only when TA1 is applied to the cell A, and the cell A being included in TAG2 is effective only when TA2 is applied to the cell A.

Alternatively, when another TA among a plurality of TAs (e.g., TA1 and TA2) can be applied to one serving cell over time, the serving cell can belong to one TAG at a specific time point. In this case, when the TA applied to the serving cell is changed (e.g., from TA1 to TA2), the TAG to which the serving cell belongs may be changed. Specifically, a cell A, a cell B, and a cell C are configured as serving cells for the UE, the UE can perform an uplink transmission using TA1 and TA2 in the cell A. And, when the UE applies TA1 and TA2 as uplink TAs in the cell B and the cell C, respectively, when TA1 is applied to the cell A, TAG1 may be composed of the cell A and the cell B, and TAG2 may be composed of the cell C. When TA2 is applied to the cell A, TAG1 may be composed of the cell B, and TAG2 may be composed of the cell A and the cell C.

When the above operation/method is supported, different TAGs may have the same serving cell as a downlink timing reference cell. For example, when TAG1 is composed of the cell A and the cell B, and TAG2 is composed of the cell A and the cell C, both TAG1 and TAG2 may have the cell A as a downlink timing reference cell.

In addition, when the above operation/method is supported, the TAG may have a serving cell not belonging to the TAG as a downlink timing reference cell. For example, when TAG1 to which TA1 is applied is composed of a cell A and a cell B, and TAG2 to which TA2 is applied is composed of a cell B and a cell C, both TAG1 and TAG2 may have a cell A as a downlink timing reference cell. In this case, a TA2 value applied to TAG2 is determined based on a cell A like TA1, but since TA1 is applied to a cell A, the cell A may not belong to TAG2. As another example, when TAG1 to which TA1 is applied is composed of a cell A and a cell B, and TAG2 to which TA2 is applied is composed of a cell C, both TAG1 and TAG2 may have a cell A as a downlink timing reference cell. In this case, a TA2 value applied to TAG2 is determined based on a cell A like TA1, but since TA1 is applied to a cell A, the cell A may not belong to TAG2.

According to the foregoing, when the UE can apply different TAs among a plurality of TAs to one serving cell over time, the TAG to which the corresponding serving cell belongs may change as the TA applied to the corresponding serving cell changes. In this case, as described above, it may be considered that the TA applied to the serving cell is dynamically changed/switched. Considering this case, it is necessary to consider a faster and more efficient TAG change method than when the TAG of the serving cell is configured through RRC configuration. To this end, the following methods can be considered.

For example, the TAG information to which the serving cell belongs may be configured and/or changed through MAC signaling. In this case, initial TAG information is configured through RRC, but other TAGs may be changed through MAC signaling. Alternatively, the TAG information of a serving cell can be configured/changed only through MAC signaling.

As another example, TAG information to which the serving cell belongs may be configured and/or changed through downlink control information (DCI). In this case, initial TAG information is configured through RRC, but other TAGs may be changed through DCI. Alternatively, TAG information of the serving cell may be configured/changed only through DCI.

As another example, a plurality of TAGs that can be applied to the serving cell are configured (using signaling such as RRC), and (valid) TAG information actually applied at a specific time point may be indicated through MAC signaling or DCI. For example, when TA1 and TA2 can be applied to the serving cell, TAG1 and TAG2 are configured as TAGs applied to the serving cell, and (valid) TAG information actually applied at a specific time point is indicated through additional MAC signaling or DCI. It can be. In this case, before additional MAC signaling or DCI is transmitted or when valid MAC signaling or DCI does not exist, it may be assumed that the serving cell belongs to one specific TAG. At this time, as an example, a specific TAG may be configured/defined as a default TAG.

As another example, a plurality of TAGs that can be applied to the serving cell are configured (using signaling such as RRC), and (valid) TAG information actually applied at a specific time point may be implicitly indicated through a change in TA. As described above, as the TA applied to the serving cell is changed, the UE may implicitly determine that the TAG of the serving cell is changed to a TAG associated with the TA.

Figure 16:
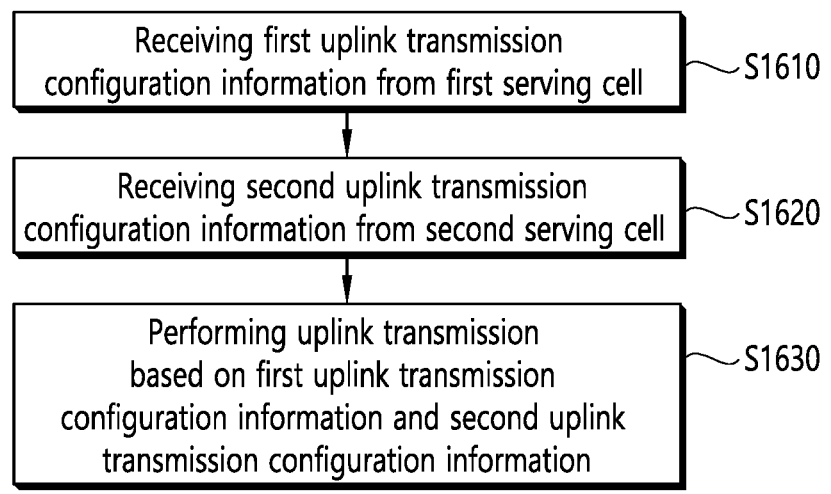
FIG. 16 is a flowchart of an example of a method for performing an uplink transmission by a wireless device according to some implementations of the present specification.

FIG. 16 is a flowchart of an example of a method for performing an uplink transmission by a wireless device according to some implementations of the present specification. Here, the wireless device may be an IAB node or a UE. Also, a plurality of serving cells may be configured for the wireless device.

Referring to FIG. 16, the wireless device receives first uplink transmission configuration information from a first serving cell (S1610). The wireless device receives second uplink transmission configuration information from the second serving cell (S1620). Here, the first uplink transmission configuration information may inform a first uplink transmission timing configured for the first serving cell. In addition, the second uplink transmission configuration information may inform a second uplink transmission timing configured for the second serving cell. Also, the first serving cell and the second serving cell may be included in a specific timing advance group (TAG).

The wireless device performs an uplink transmission based on the first uplink transmission configuration information and the second uplink transmission configuration information (S1630).

Here, TA value(s) supported by serving cells within the same TAG may always be the same. That is, in the example of FIG. 16, the first uplink transmission timing and the second uplink transmission timing may always be the same. In this case, the wireless device may perform one or both of uplink transmission through the first cell and uplink transmission through the second cell based on the same uplink transmission timing.

Alternatively, in the example of FIG. 16, based on a difference between the first uplink transmission timing and the second uplink transmission timing, the wireless device performs the uplink transmission based on an uplink transmission timing that matches a reference uplink transmission timing applied to a downlink timing reference cell among the first uplink transmission timing and the second uplink transmission timing. For example, if the first uplink transmission timing configured for the first serving cell is the same as the reference uplink transmission timing, the wireless device may perform the uplink operation based on the first uplink transmission timing on the first serving cell. Here, the downlink timing reference cell may be one of the first serving cell and the second serving cell. Alternatively, the downlink timing reference cell, the first serving cell, and the second serving cell may be included in the same TAG.

Meanwhile, although the example of FIG. 16 assumes that a plurality of cells are included in the same TAG, the example of FIG. 16 can be extended and applied even when each of the plurality of serving cells is included in a different TAG. In this case, only one uplink transmission timing may be valid at a specific point in time.

Figure 17:
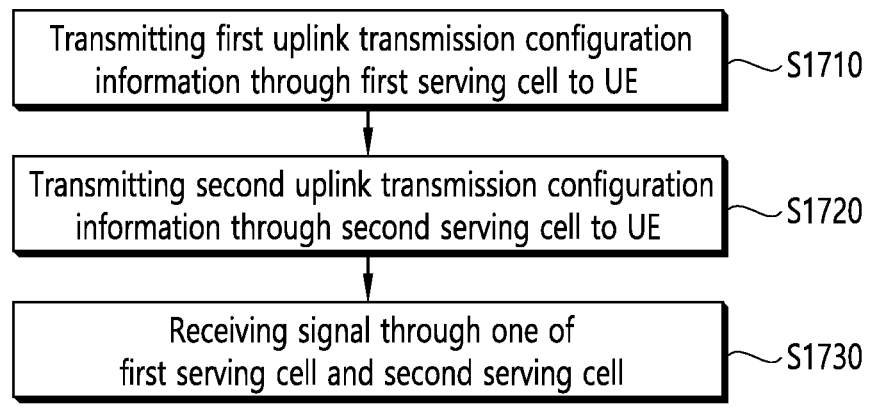
FIG. 17 is a flowchart of an example of a method for receiving a signal of a wireless device according to some implementations of the present specification.

FIG. 17 is a flowchart of an example of a method for receiving a signal of a wireless device according to some implementations of the present specification. Here, the wireless device may be an IAB node or a base station.

Referring to FIG. 17, the wireless device transmits first uplink transmission configuration information to the UE through the first serving cell (S1710). The wireless device transmits second uplink transmission configuration information to the UE through the second serving cell (S1720).

The wireless device receives a signal through one of the first serving cell and the second serving cell (S1730).

Here, the first uplink transmission configuration information may inform the first uplink transmission timing configured for the first serving cell. In addition, the second uplink transmission configuration information may inform the second uplink transmission timing configured for the second serving cell. Also, the first serving cell and the second serving cell may be included in a specific timing advance group (TAG).

Here, based on a difference between the first uplink transmission timing and the second uplink transmission timing, the wireless device may receive the signal based on uplink transmission timing matching a reference uplink transmission timing applied to a downlink timing reference cell among the first uplink transmission timing and the second uplink transmission timing. For example, if the first uplink transmission timing configured for the first serving cell is the same as the reference uplink transmission timing, the wireless device may receive the signal based on the first uplink transmission timing on the first serving cell. Here, the downlink timing reference cell may be one of the first serving cell and the second serving cell. Alternatively, the downlink timing reference cell, the first serving cell, and the second serving cell may be included in the same TAG.

The methods proposed in this specification can also be performed by, in addition to the IAB node, at least one computer readable medium including instructions based on being executed by at least one processor (computer readable medium), the apparatus configured to control the IAB node including one or more processors and one or more processors operably coupled by the one or more processors, and one or more memories for storing instructions, where the one or more processors execute the instructions to perform the methods proposed herein. Also, it is obvious that, according to the methods proposed in this specification, an operation by the base station corresponding to the operation performed by the IAB node may be considered.

Hereinafter, an example of a communication system to which the present disclosure is applied will be described.

Although not limited to this, various descriptions, functions, procedures, proposals, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 18:
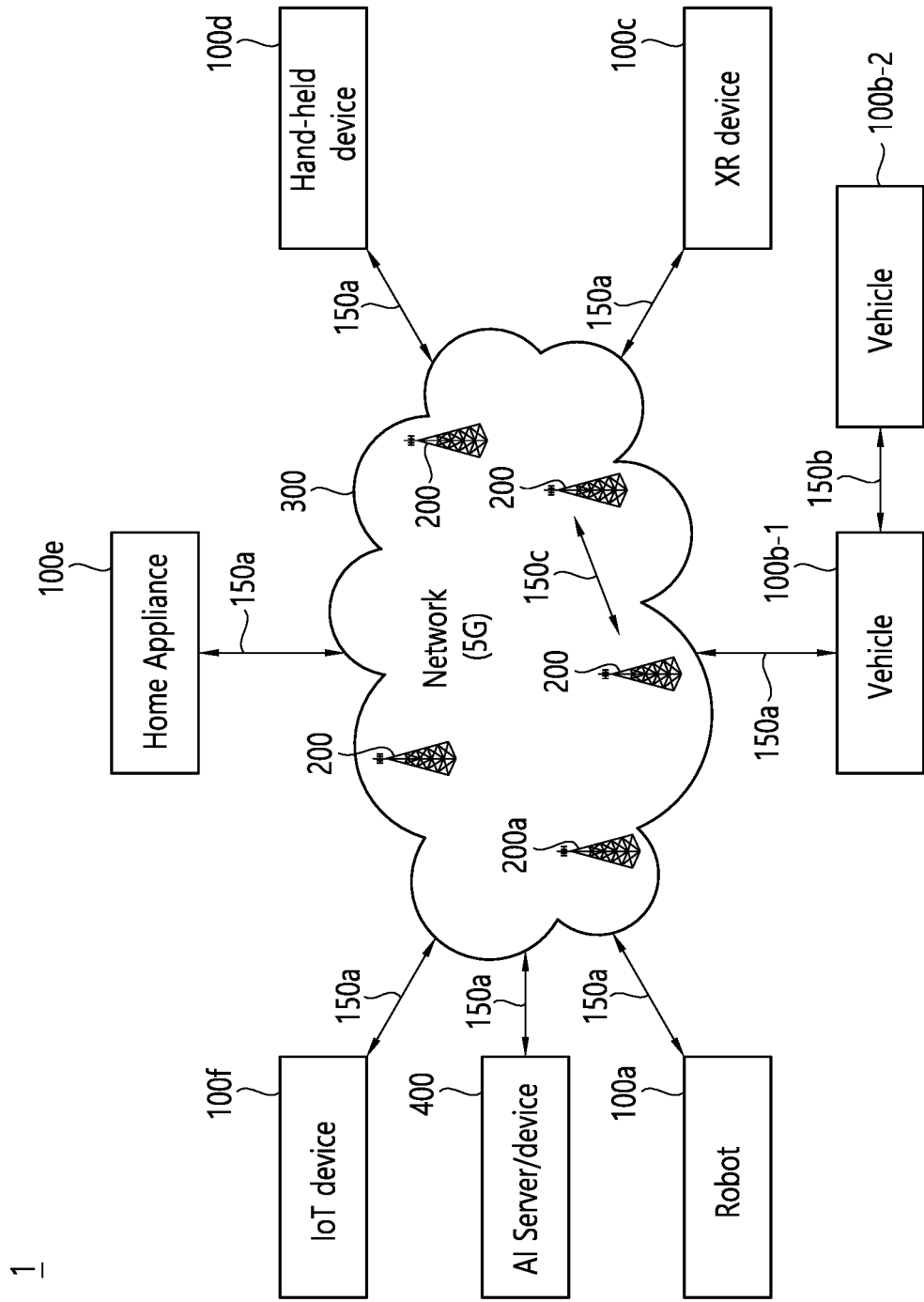
FIG. 18 shows a communication system (1), in accordance with an embodiment of the present disclosure.

FIG. 18 shows a communication system (1), in accordance with an embodiment of the present disclosure.

Referring to FIG. 18, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100*a*), vehicles (100*b*-1, 100*b*-2), an extended Reality (XR) device (100*c*), a hand-held device (100*d*), a home appliance (100*e*), an Internet of Things (IoT) device (100*f*), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200*a*) may operate as a BS/network node with respect to other wireless devices.

Here, the wireless communication technology implemented in the wireless device of the present specification may include a narrowband Internet of Things for low-power communication as well as LTE, NR, and 6G. In this case, for example, the NB-IoT technology may be an example of a Low Power Wide Area Network (LPWAN) technology. In addition, it may be implemented in standards such as LTE Cat NB1 and/or LTE Cat NB2, and is not limited to the above-described name. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless device of the present specification may include at least one of ZigBee, Bluetooth, and Low Power Wide Area Network (LPWAN) in consideration of low-power communication, and is not limited to the above-described name. For example, the ZigBee technology can create PAN (personal area networks) related to small/low-power digital communication based on various standards such as IEEE 802.15.4, and can be called by various names.

The wireless devices (100*a*~100*f*) may be connected to the network (300) via the BSs (200). An AI technology may be applied to the wireless devices (100*a*~100*f*) and the wireless devices (100*a*~100*f*) may be connected to the AI server (400) via the network (300). The network (300) may be configured using a 3G network, a 4G (e.g., LTE) network, or a 5G (e.g., NR) network. Although the wireless devices (100*a*~100*f*) may communicate with each other through the BSs (200)/network (300), the wireless devices (100*a*~100*f*) may perform direct communication (e.g., sidelink communication) with each other without passing through the BSs/network. For example, the vehicles (100*b*-1, 100*b*-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100*a*~100*f*).

Wireless communication/connections (150*a*, 150*b*, 150*c*) may be established between the wireless devices (100*a*~100*f*)/BS (200), or BS (200)/BS (200). Herein, the wireless communication/connections may be established through various RATs (e.g., 5G NR) such as uplink/downlink communication (150*a*), sidelink communication (150*b*) (or, D2D communication), or inter BS communication (e.g. relay, Integrated Access Backhaul (IAB)). The wireless devices and the BSs/the wireless devices may transmit/receive radio signals to/from each other through the wireless communication/connections (150*a*, 150*b*). For example, the wireless communication/connections (150*a*, 150*b*) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
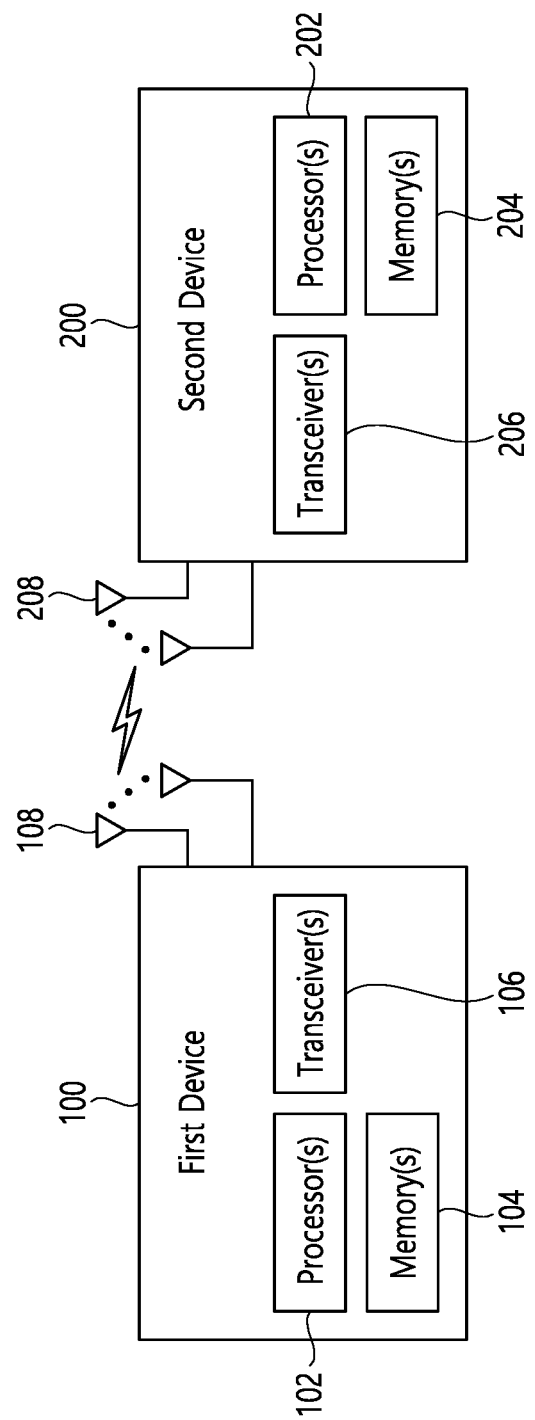
FIG. 19 shows wireless devices, in accordance with an embodiment of the present disclosure.

FIG. 19 shows wireless devices, in accordance with an embodiment of the present disclosure.

Referring to FIG. 19, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 18.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 20:
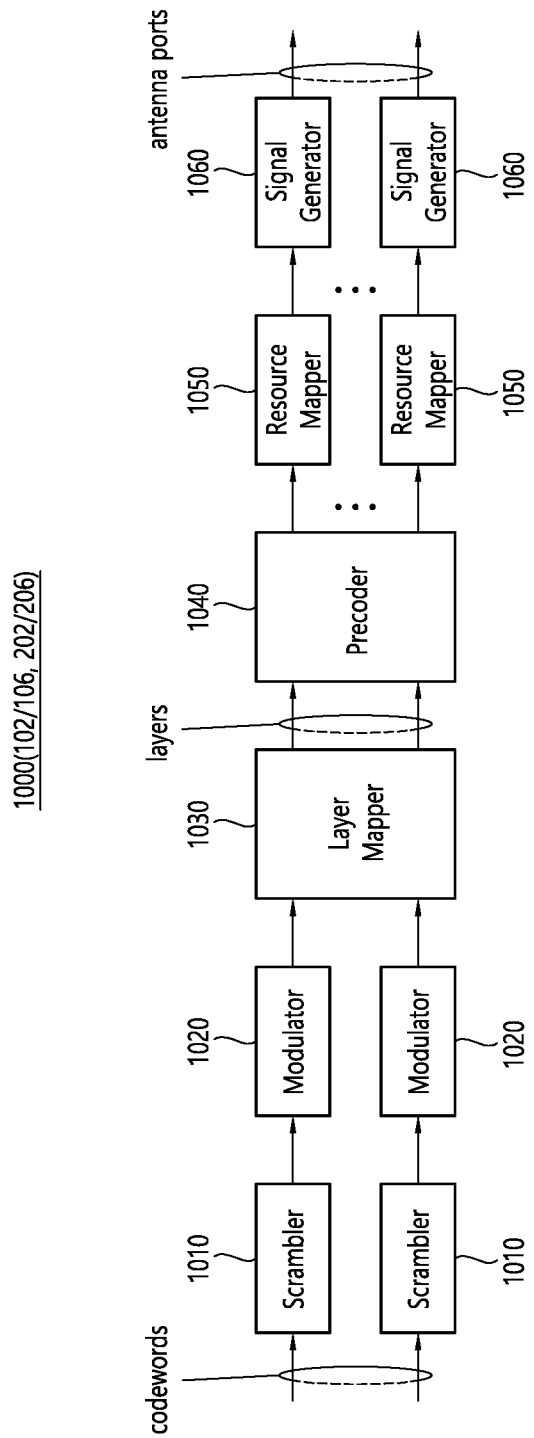
FIG. 20 shows a signal process circuit for a transmission signal, in accordance with an embodiment of the present disclosure.

FIG. 20 shows a signal process circuit for a transmission signal, in accordance with an embodiment of the present disclosure.

Referring to FIG. 20, a signal processing circuit (1000) may include scramblers (1010), modulators (1020), a layer mapper (1030), a precoder (1040), resource mappers (1050), and signal generators (1060). An operation/function of FIG. 20 may be performed, without being limited to, the processors (102, 202) and/or the transceivers (106, 206) of FIG. 19. Hardware elements of FIG. 20 may be implemented by the processors (102, 202) and/or the transceivers (106, 206) of FIG. 19. For example, blocks 1010~1060 may be implemented by the processors (102, 202) of FIG. 19. Alternatively, the blocks 1010~1050 may be implemented by the processors (102, 202) of FIG. 19 and the block 1060 may be implemented by the transceivers (106, 206) of FIG. 19.

Codewords may be converted into radio signals via the signal processing circuit (1000) of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 20. For example, the wireless devices (e.g., 100, 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
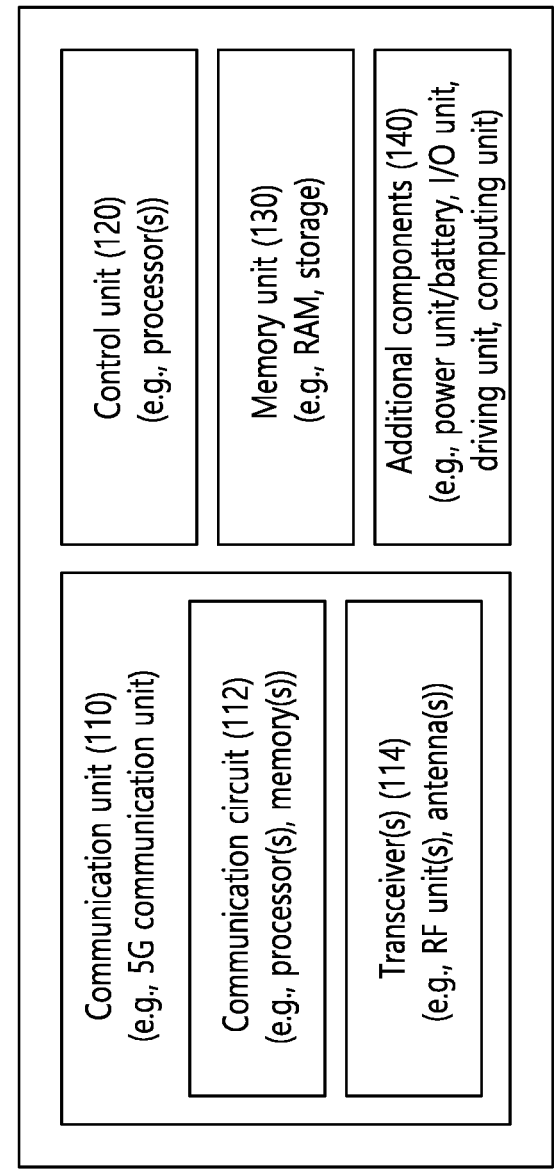
FIG. 21 shows another example of a wireless device, in accordance with an embodiment of the present disclosure.

FIG. 21 shows another example of a wireless device, in accordance with an embodiment of the present disclosure. The wireless device may be implemented in various forms according to a use-case/service (refer to FIG. 18).

Referring to FIG. 21, wireless devices (100, 200) may correspond to the wireless devices (100, 200) of FIG. 19 and may be configured by various elements, components, units/ portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 19. For example, the transceiver(s) (114) may include the one or more transceivers (106, 206) and/or the one or more antennas (108, 208) of FIG. 19. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 18), the vehicles (100b-1, 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, and so on. The wireless device may be used in a mobile or fixed place according to a use-example/service.

In FIG. 21, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
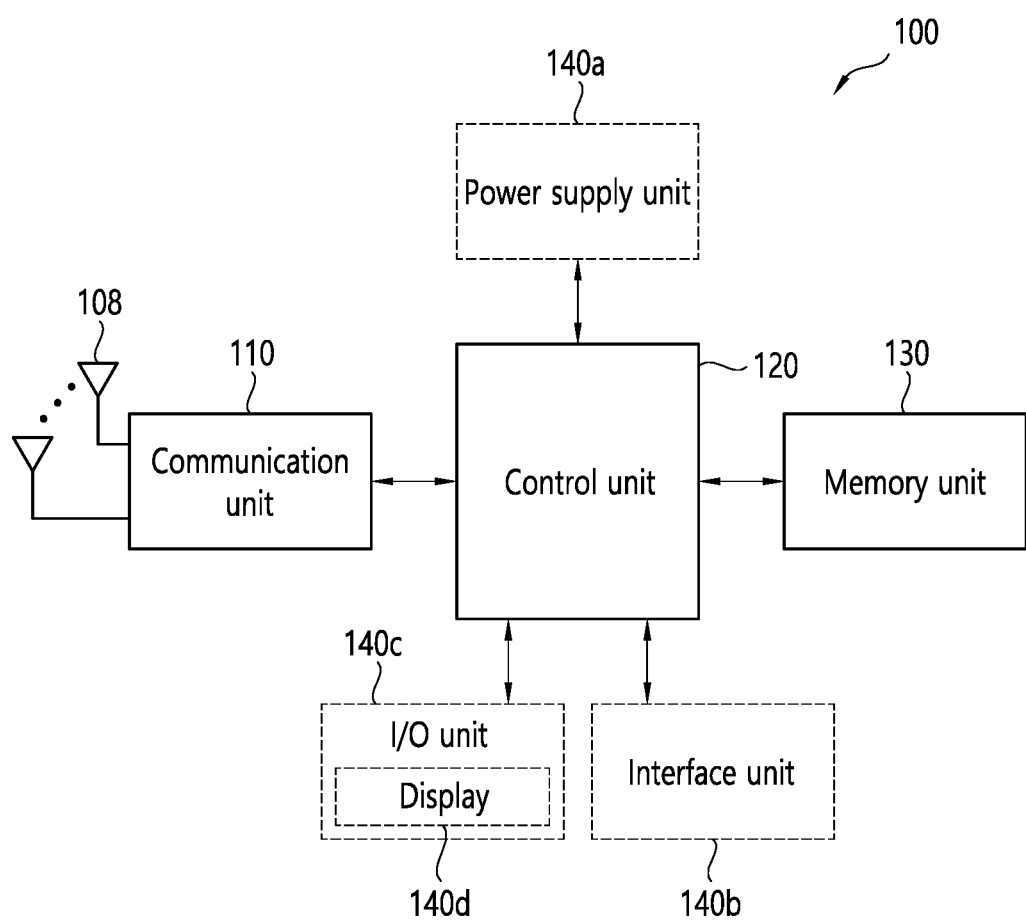
FIG. 22 shows a hand-held device, in accordance with an embodiment of the present disclosure.

FIG. 22 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 21, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 23:
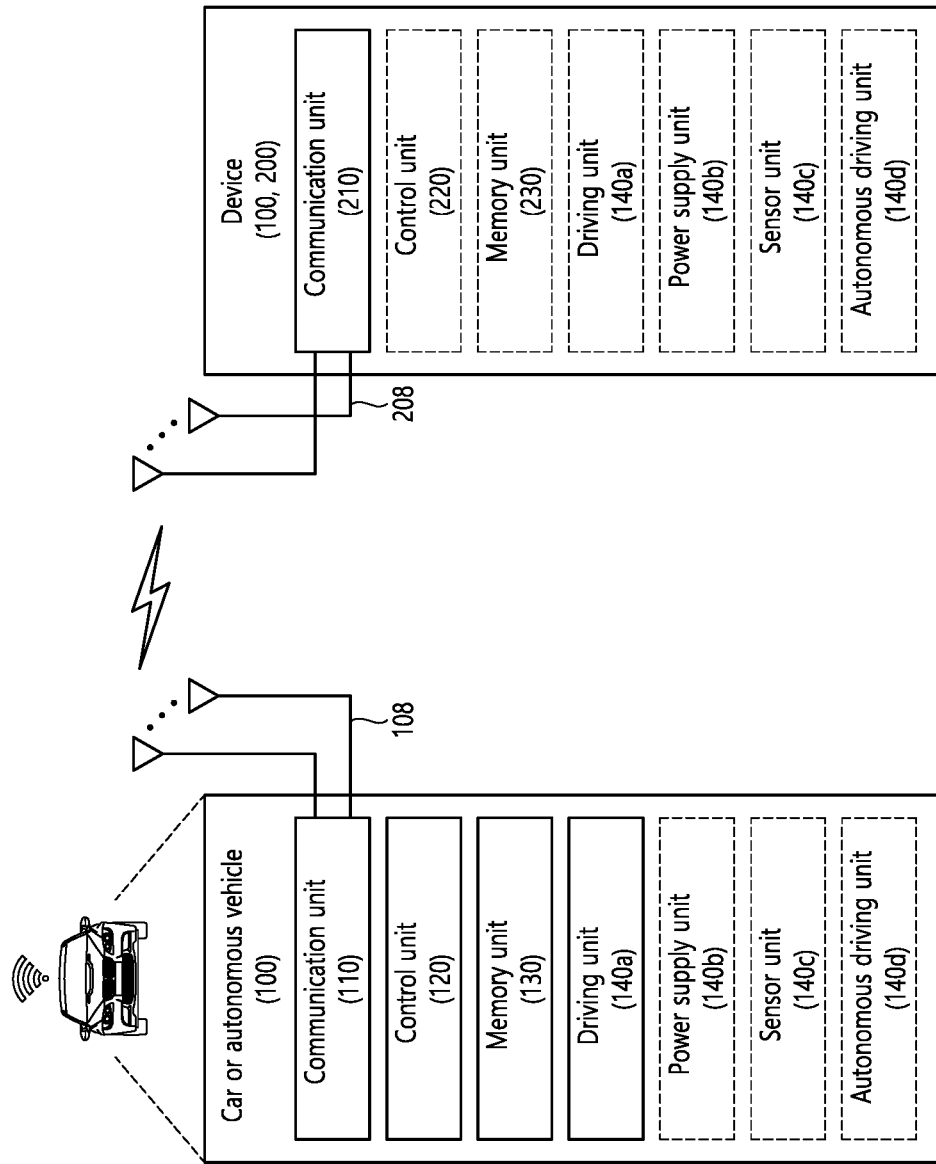
FIG. 23 shows a vehicle or an autonomous vehicle, in accordance with an embodiment of the present disclosure.

FIG. 23 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 23, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 21, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 24:
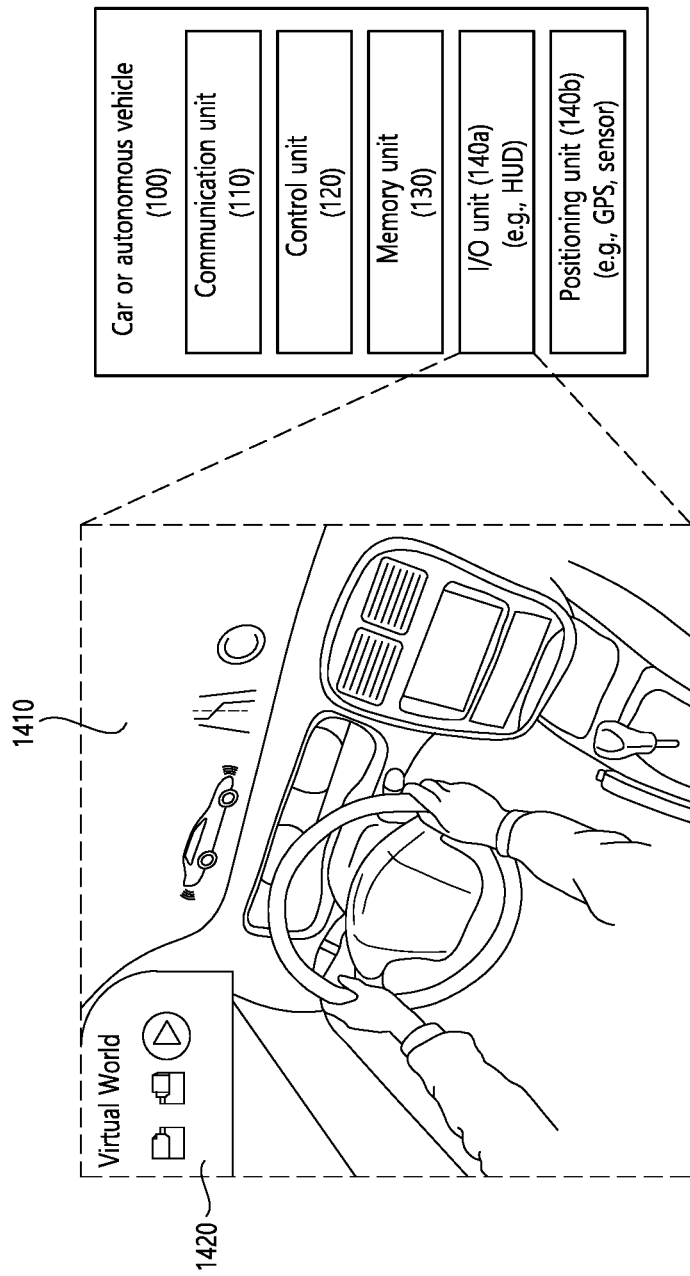
FIG. 24 shows a vehicle, in accordance with an embodiment of the present disclosure.

FIG. 24 shows a vehicle, in accordance with an embodiment of the present disclosure. The vehicle may be implemented as a transport means, an aerial vehicle, a ship, and so on.

Referring to FIG. 24, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 21. The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 25:
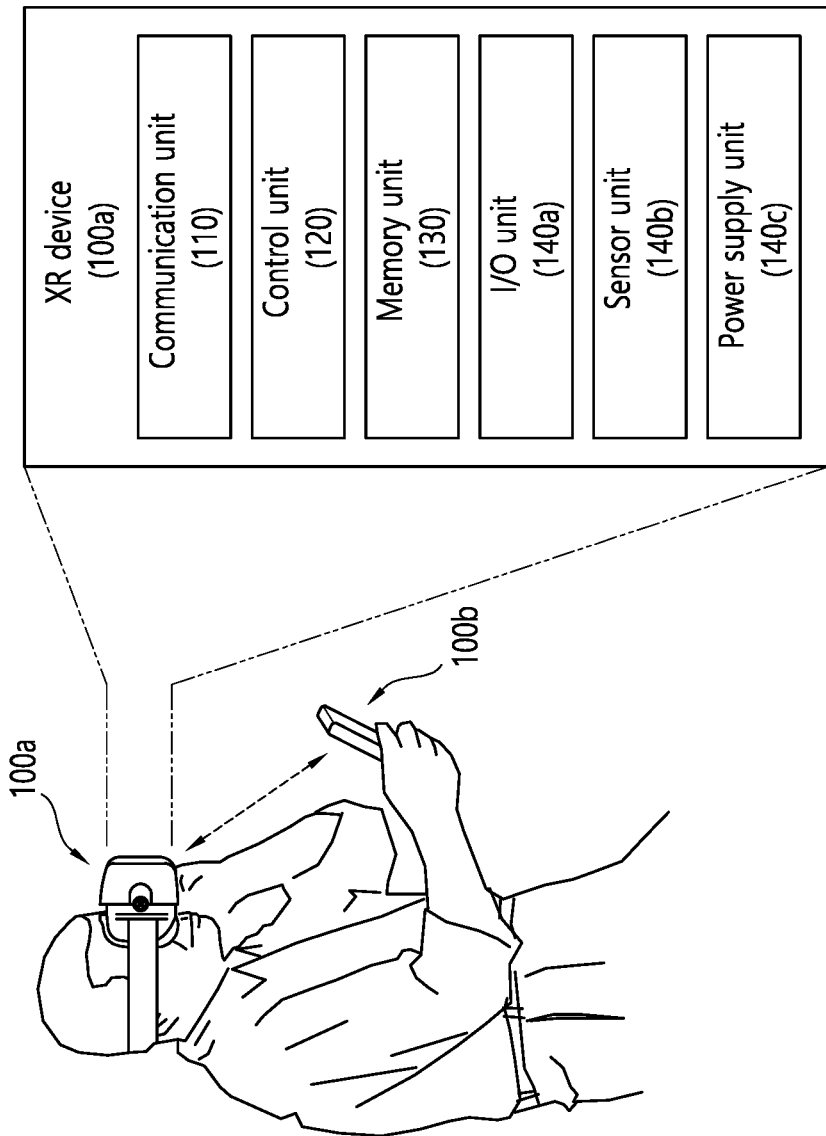
FIG. 25 shows an XR device, in accordance with an embodiment of the present disclosure.

FIG. 25 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 25, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 31, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 26:
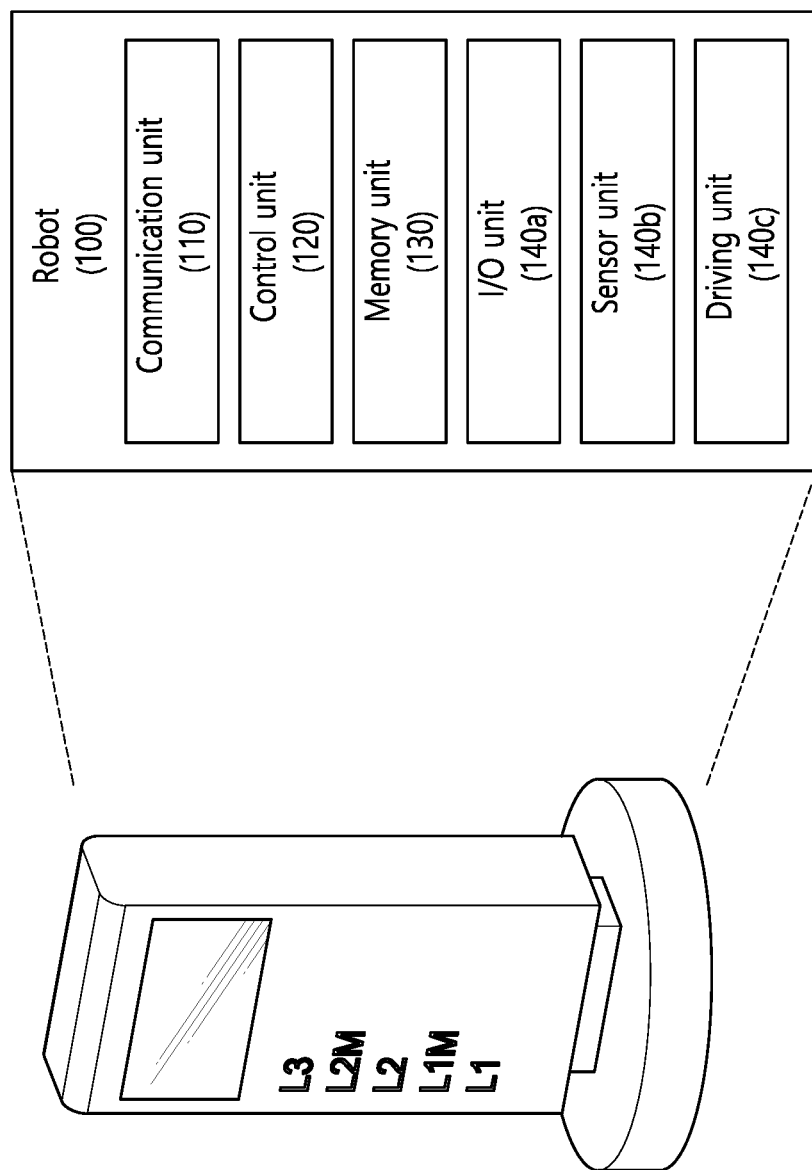
FIG. 26 shows a robot, in accordance with an embodiment of the present disclosure.

FIG. 26 shows a robot, in accordance with an embodiment of the present disclosure. The robot may be categorized into an industrial robot, a medical robot, a household robot, a military robot, and so on, according to a used purpose or field.

Referring to FIG. 26, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 21, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 27:
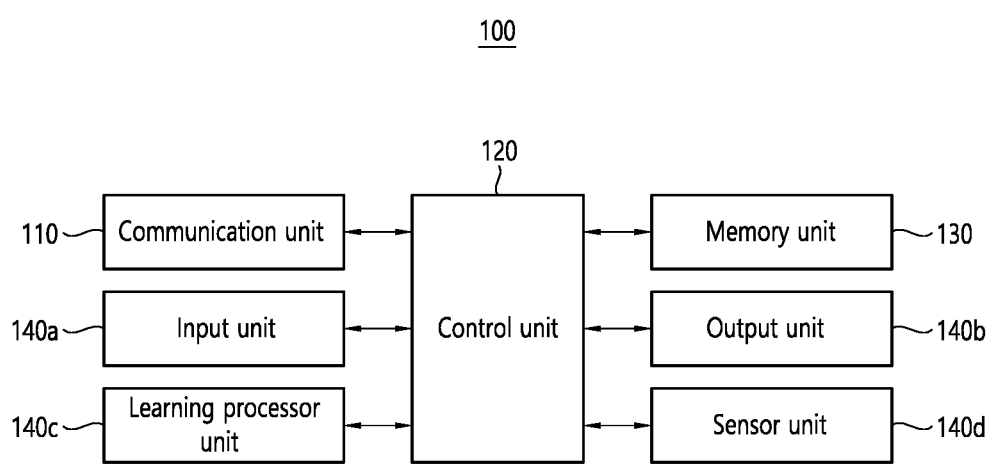
FIG. 27 shows an AI device, in accordance with an embodiment of the present disclosure.

FIG. 27 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 27, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 21, respectively.

The communication unit (110) may transmit and receive wired/radio signals (e.g., sensor information, user input, learning models, or control signals) to and from external devices such as other AI devices (e.g., 100x, 200, 400 of FIG. 18) or an AI server (e.g., 400 of FIG. 18) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 19). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 18). The learning processor unit (140c) may process information received from an external device through the communication unit (110) and/or information stored in the memory unit (130). In addition, an output value of the learning processor unit (140*c*) may be transmitted to the external device through the communication unit (110) and may be stored in the memory unit (130).

The claims set forth herein can be combined in a variety of ways. For example, the technical features of the method claims of the present specification may be combined to be implemented as a device, and the technical features of the device claims of the present specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method, comprising:
   receiving, by an integrated access and backhaul (IAB) node including an IAB-mobile terminal (MT) and an IAB-distributed unit (DU), timing alignment information, wherein the timing alignment information is related to a timing alignment case for the IAB-MT; and
   applying, by the IAB node, the timing alignment case in a specific time resource,
   wherein the timing alignment case is one of timing alignment case 1, timing alignment case 6, and timing alignment case 7, and
   wherein upon reception of the timing alignment information for a specific serving cell in a timing advance group (TAG), the IAB node applies the timing alignment case in the specific time resource on all serving cells in the TAG.

2. The method of claim 1, wherein in the timing alignment case 1, the IAB node adjusts an IAB-MT transmission time based on timing advance (TA) configuration information which is provided.

3. The method of claim 1, wherein in the timing alignment case 6, the IAB node sets an IAB-MT transmission time to a transmission time of the IAB-DU.

4. The method of claim 1, wherein in the timing alignment case 7, the IAB node determines an IAB-MT transmission time based on additional TA configuration information which is provided.

5. The method of claim 1, wherein the IAB node receives the timing alignment information from a parent node of the IAB node.

6. The method of claim 1, wherein the specific time resource is a slot.

7. An integrated access and backhaul (IAB) node, comprising:
   at least one transceiver;
   at least one memory; and
   at least one processor operably connectable to the at least one transceiver and the at least one memory,
   wherein the at least one memory stores instructions that, based on being executed by the at least one processor, cause the at least one processor to perform operations comprising:
   receiving timing alignment information, wherein the timing alignment information is related to a timing alignment case for an IAB-mobile terminal (MT) of the IAB node including the IAB-MT and an IAB-distributed unit (DU); and
   applying the timing alignment case in a specific time resource,
   wherein the timing alignment case is one of timing alignment case 1, timing alignment case 6, and timing alignment case 7, and
   wherein upon reception of the timing alignment information for a specific serving cell in a timing advance group (TAG), the IAB node applies the timing alignment case in the specific time resource on all serving cells in the TAG.

* * * * *